US010596572B2

(12) United States Patent
Hong et al.

(10) Patent No.: US 10,596,572 B2
(45) Date of Patent: Mar. 24, 2020

(54) FEEDBACK SYSTEM FOR PARALLEL DROPLET CONTROL IN A DIGITAL MICROFLUIDIC DEVICE

(71) Applicant: MIROCULUS INC., San Francisco, CA (US)

(72) Inventors: Ik Pyo Hong, Toronto (CA); Irena Barbulovic-Nad, Toronto (CA); Jorge Abraham Soto-Moreno, San Francisco, CA (US)

(73) Assignee: mirOculus Inc., San Francisco, CA (US)

( * ) Notice: Subject to any disclaimer, the term of this patent is extended or adjusted under 35 U.S.C. 154(b) by 0 days.

(21) Appl. No.: 16/324,420

(22) PCT Filed: Aug. 22, 2017

(86) PCT No.: PCT/US2017/048081
§ 371 (c)(1),
(2) Date: Feb. 8, 2019

(87) PCT Pub. No.: WO2018/039281
PCT Pub. Date: Mar. 1, 2018

(65) Prior Publication Data

US 2019/0217301 A1 Jul. 18, 2019

Related U.S. Application Data

(60) Provisional application No. 62/377,797, filed on Aug. 22, 2016.

(51) Int. Cl.
*G01N 27/453* (2006.01)
*B01L 3/00* (2006.01)

(52) U.S. Cl.
CPC ... *B01L 3/502792* (2013.01); *B01L 2300/165* (2013.01); *B01L 2300/1822* (2013.01);
(Continued)

(58) Field of Classification Search
CPC .................... B01L 3/502784; B01L 3/502792
See application file for complete search history.

(56) References Cited

U.S. PATENT DOCUMENTS 4,469,863 A 9/1984 Ts'o et al.
4,569,575 A 2/1986 Le Pesant et al.
(Continued)

FOREIGN PATENT DOCUMENTS

CA 2470847 A1 7/2003
CA 2740113 A1 4/2010
(Continued)

OTHER PUBLICATIONS

Li et al., "A Low-Cost and High resolution Droplet Position Detector for an Intelligent Electrowetting on Dielectric Device," Journal of Laboratory Automation 2015, vol. 20(6) 663-669 (Year: 2015).*

(Continued)

*Primary Examiner* — Alexander S Noguerola
(74) *Attorney, Agent, or Firm* — Shay Glenn LLP

(57) ABSTRACT

Digital microfluidics apparatuses (e.g., devices and systems) configured to determine provide feedback on the location, rate of movement, rate of evaporation and/or size (or other physical characteristic) of one or more, and preferably more than one, droplet in the gap region of a digital microfluidics (DMF) apparatus.

24 Claims, 12 Drawing Sheets

(52) U.S. Cl.
CPC .................. *B01L 2300/1894* (2013.01); *B01L 2400/0424* (2013.01)

(56) References Cited

U.S. PATENT DOCUMENTS

| | | | |
|---|---|---|---|
| 4,636,785 | A | 1/1987 | Le Pesant |
| 4,818,052 | A | 4/1989 | Le Pesant et al. |
| 5,034,506 | A | 7/1991 | Summerton et al. |
| 5,130,238 | A | 7/1992 | Malek et al. |
| 5,216,141 | A | 6/1993 | Benner |
| 5,235,033 | A | 8/1993 | Summerton et al. |
| 5,270,185 | A | 12/1993 | Margolskee |
| 5,386,023 | A | 1/1995 | Sanghvi et al. |
| 5,399,491 | A | 3/1995 | Kacian et al. |
| 5,409,818 | A | 4/1995 | Davey et al. |
| 5,411,876 | A | 5/1995 | Bloch et al. |
| 5,455,166 | A | 10/1995 | Walker |
| 5,486,337 | A | 1/1996 | Ohkawa |
| 5,602,240 | A | 2/1997 | De Mesmaeker et al. |
| 5,637,684 | A | 6/1997 | Cook et al. |
| 5,644,048 | A | 7/1997 | Yau |
| 5,681,702 | A | 10/1997 | Collins et al. |
| 5,705,365 | A | 1/1998 | Ryder et al. |
| 5,710,029 | A | 1/1998 | Ryder et al. |
| 5,888,779 | A | 3/1999 | Kacian et al. |
| 6,007,690 | A | 12/1999 | Nelson et al. |
| 6,074,725 | A | 6/2000 | Kennedy |
| 6,294,063 | B1 | 9/2001 | Becker et al. |
| 6,352,838 | B1 | 3/2002 | Krulevitch et al. |
| 6,401,552 | B1 | 6/2002 | Elkins |
| 6,565,727 | B1 | 5/2003 | Shenderov |
| 6,596,988 | B2 | 7/2003 | Corso et al. |
| 6,723,985 | B2 | 4/2004 | Schultz et al. |
| 6,773,566 | B2 | 8/2004 | Shenderov |
| 6,887,384 | B1 | 5/2005 | Frechet et al. |
| 6,911,132 | B2 | 6/2005 | Pamula et al. |
| 6,989,234 | B2 | 1/2006 | Kolar et al. |
| 7,147,763 | B2 | 12/2006 | Elrod et al. |
| 7,163,612 | B2 | 1/2007 | Sterling et al. |
| 7,214,302 | B1 | 5/2007 | Reihs et al. |
| 7,323,345 | B1 | 1/2008 | Stjernstrom |
| 7,328,979 | B2 | 2/2008 | Decre et al. |
| 7,329,545 | B2 | 2/2008 | Pamula et al. |
| 7,349,014 | B2 | 3/2008 | Higashihara |
| 7,390,463 | B2 | 6/2008 | He et al. |
| 7,391,020 | B2 | 6/2008 | Bousse et al. |
| 7,439,014 | B2 | 10/2008 | Pamula et al. |
| 7,445,926 | B2 | 11/2008 | Mathies et al. |
| 7,531,120 | B2 | 5/2009 | Van Rijn et al. |
| D599,832 | S | 9/2009 | Chapin et al. |
| 7,713,456 | B2 | 5/2010 | Dodd et al. |
| 7,727,723 | B2 | 6/2010 | Pollack et al. |
| 7,745,207 | B2 | 6/2010 | Jovanovich et al. |
| 7,763,471 | B2 | 7/2010 | Pamula et al. |
| 7,815,871 | B2 | 10/2010 | Pamula et al. |
| 7,816,121 | B2 | 10/2010 | Pollack et al. |
| 7,822,510 | B2 | 10/2010 | Paik et al. |
| 7,851,184 | B2 | 12/2010 | Pollack et al. |
| 7,901,947 | B2 | 3/2011 | Pollack et al. |
| 7,919,330 | B2 | 4/2011 | de Guzman et al. |
| 7,939,021 | B2 | 5/2011 | Smith et al. |
| 7,998,436 | B2 | 8/2011 | Pollack et al. |
| 8,007,739 | B2 | 8/2011 | Pollack et al. |
| 8,041,463 | B2 | 10/2011 | Pollack et al. |
| 8,053,239 | B2 | 11/2011 | Wheeler et al. |
| 8,088,578 | B2 | 1/2012 | Hua et al. |
| 8,093,062 | B2 | 1/2012 | Winger |
| 8,137,917 | B2 | 3/2012 | Pollack et al. |
| 8,187,864 | B2 | 5/2012 | Wheeler et al. |
| 8,190,371 | B2 | 5/2012 | Allawi et al. |
| 8,202,686 | B2 | 6/2012 | Pamula et al. |
| 8,202,736 | B2 | 6/2012 | Mousa et al. |
| 8,208,146 | B2 | 6/2012 | Srinivasan et al. |
| 8,268,246 | B2 | 9/2012 | Srinivasan et al. |
| 8,304,253 | B2 | 11/2012 | Yi et al. |
| 8,317,990 | B2 | 11/2012 | Pamula et al. |
| 8,349,276 | B2 | 1/2013 | Pamula et al. |
| 8,364,315 | B2 | 1/2013 | Sturmer et al. |
| 8,389,297 | B2 | 3/2013 | Pamula et al. |
| 8,394,641 | B2 | 3/2013 | Winger |
| 8,399,222 | B2 | 3/2013 | Siva et al. |
| 8,426,213 | B2 | 4/2013 | Eckhardt et al. |
| 8,440,392 | B2 | 5/2013 | Pamula et al. |
| 8,454,905 | B2 | 6/2013 | Pope et al. |
| 8,460,528 | B2 | 6/2013 | Pollack et al. |
| 8,470,153 | B2 | 6/2013 | Feiglin et al. |
| 8,470,606 | B2 | 6/2013 | Srinivasan et al. |
| 8,481,125 | B2 | 7/2013 | Yi et al. |
| 8,492,168 | B2 | 7/2013 | Srinivasan et al. |
| 8,562,807 | B2 | 10/2013 | Srinivasan et al. |
| 8,591,830 | B2 | 11/2013 | Sudarsan et al. |
| 8,592,217 | B2 | 11/2013 | Eckhardt |
| 8,613,889 | B2 | 12/2013 | Pollack et al. |
| 8,637,317 | B2 | 1/2014 | Pamula et al. |
| 8,637,324 | B2 | 1/2014 | Pollack et al. |
| 8,658,111 | B2 | 2/2014 | Srinivasan et al. |
| 8,685,344 | B2 | 4/2014 | Sudarsan et al. |
| 8,685,754 | B2 | 4/2014 | Pollack et al. |
| 8,702,938 | B2 | 4/2014 | Srinivasan et al. |
| 8,716,015 | B2 | 5/2014 | Pollack et al. |
| 8,809,068 | B2 | 8/2014 | Sista et al. |
| 8,821,705 | B2 | 9/2014 | Bjornson et al. |
| 8,845,872 | B2 | 9/2014 | Pollack et al. |
| 8,846,414 | B2 | 9/2014 | Sista et al. |
| 8,852,952 | B2 | 10/2014 | Pollack et al. |
| 8,872,527 | B2 | 10/2014 | Sturmer et al. |
| 8,877,512 | B2 | 11/2014 | Srinivasan et al. |
| 8,888,969 | B2 | 11/2014 | Soleymani et al. |
| 8,901,043 | B2 | 12/2014 | Eckhardt et al. |
| 8,926,065 | B2 | 1/2015 | Winger |
| 8,927,296 | B2 | 1/2015 | Sista et al. |
| 8,936,708 | B2 | 1/2015 | Feiglin et al. |
| 8,951,732 | B2 | 2/2015 | Pollack et al. |
| 8,980,198 | B2 | 3/2015 | Srinivasan et al. |
| 9,005,544 | B2 | 4/2015 | Van Dam et al. |
| 9,011,662 | B2 | 4/2015 | Wang et al. |
| 9,039,973 | B2 | 5/2015 | Watson et al. |
| 9,046,514 | B2 | 6/2015 | Sista et al. |
| 9,091,649 | B2 | 7/2015 | Pollack et al. |
| 9,140,635 | B2 | 9/2015 | Graham et al. |
| 9,188,615 | B2 | 11/2015 | Sturmer et al. |
| 9,223,317 | B2 | 12/2015 | Winger |
| 9,238,222 | B2 | 1/2016 | Delattre et al. |
| 9,248,450 | B2 | 2/2016 | Bauer |
| 9,377,439 | B2 | 6/2016 | Lee et al. |
| 9,435,765 | B2 | 9/2016 | Reimitz et al. |
| 9,446,404 | B2 | 9/2016 | Bauer et al. |
| 9,476,811 | B2 | 10/2016 | Mudrik et al. |
| 9,476,856 | B2 | 10/2016 | Pamula et al. |
| 9,513,253 | B2 | 12/2016 | Winger |
| 9,517,469 | B2 | 12/2016 | Shenderov et al. |
| 9,594,056 | B2 | 3/2017 | Fobel et al. |
| 9,851,365 | B2 | 12/2017 | Mousa et al. |
| 10,232,374 | B2 | 3/2019 | Jebrail et al. |
| 2002/0150683 | A1 | 10/2002 | Troian et al. |
| 2003/0017551 | A1 | 1/2003 | Parthasarathy et al. |
| 2003/0136451 | A1 | 7/2003 | Beebe et al. |
| 2003/0194716 | A1 | 10/2003 | Knoll |
| 2004/0058450 | A1 * | 3/2004 | Pamula ............... B01F 13/0071 436/150 |
| 2004/0171169 | A1 | 9/2004 | Kallury et al. |
| 2004/0211659 | A1 | 10/2004 | Velev |
| 2005/0115836 | A1 | 6/2005 | Reihs |
| 2005/0133370 | A1 | 6/2005 | Park et al. |
| 2005/0148091 | A1 | 7/2005 | Kitaguchi et al. |
| 2005/0191759 | A1 | 9/2005 | Pedersen Bjergaard et al. |
| 2005/0220675 | A1 | 10/2005 | Reed et al. |
| 2006/0091015 | A1 | 5/2006 | Lau |
| 2006/0132542 | A1 | 6/2006 | Bruker et al. |
| 2006/0231398 | A1 | 10/2006 | Sarrut et al. |
| 2006/0272942 | A1 | 12/2006 | Sirringhaus |
| 2007/0023292 | A1 | 2/2007 | Kim et al. |
| 2007/0095407 | A1 | 5/2007 | Chen et al. |
| 2007/0148763 | A1 | 6/2007 | Huh et al. |

(56) References Cited

U.S. PATENT DOCUMENTS

| | | | | |
|---|---|---|---|---|
| 2007/0269825 | A1 | 11/2007 | Wang et al. | |
| 2008/0110753 | A1 | 5/2008 | Fourrier et al. | |
| 2008/0131904 | A1 | 6/2008 | Parce et al. | |
| 2008/0156983 | A1 | 7/2008 | Fourrier et al. | |
| 2008/0169197 | A1 | 7/2008 | McRuer et al. | |
| 2008/0185339 | A1 | 8/2008 | Delapierre et al. | |
| 2008/0210558 | A1 | 9/2008 | Sauter-Starace et al. | |
| 2008/0241831 | A1 | 10/2008 | Fan et al. | |
| 2008/0293051 | A1 | 11/2008 | Levy et al. | |
| 2009/0017197 | A1 | 1/2009 | Zhang et al. | |
| 2009/0017453 | A1 | 1/2009 | Maples et al. | |
| 2009/0203063 | A1 | 8/2009 | Wheeler et al. | |
| 2010/0025250 | A1 | 2/2010 | Pamula et al. | |
| 2010/0032293 | A1 | 2/2010 | Pollack et al. | |
| 2010/0048410 | A1 | 2/2010 | Shenderov et al. | |
| 2010/0087012 | A1 | 4/2010 | Shenderov | |
| 2010/0120130 | A1 | 5/2010 | Srinivasan et al. | |
| 2010/0130369 | A1 | 5/2010 | Shenderov et al. | |
| 2010/0136544 | A1 | 6/2010 | Agresti et al. | |
| 2010/0194408 | A1 * | 8/2010 | Sturmer ................. | G01N 27/22 324/664 |
| 2010/0206094 | A1 | 8/2010 | Shenderov | |
| 2010/0236927 | A1 | 9/2010 | Pope et al. | |
| 2010/0236928 | A1 | 9/2010 | Srinivasan et al. | |
| 2010/0236929 | A1 | 9/2010 | Pollack et al. | |
| 2010/0270156 | A1 | 10/2010 | Srinivasan et al. | |
| 2010/0311599 | A1 | 12/2010 | Wheeler et al. | |
| 2011/0024793 | A1 | 2/2011 | Jeon | |
| 2011/0076685 | A1 | 3/2011 | Moeller et al. | |
| 2011/0097763 | A1 | 4/2011 | Pollack et al. | |
| 2011/0104725 | A1 | 5/2011 | Pamula et al. | |
| 2011/0104747 | A1 | 5/2011 | Pollack et al. | |
| 2011/0107822 | A1 | 5/2011 | Bunner et al. | |
| 2011/0147216 | A1 | 6/2011 | Fan et al. | |
| 2011/0240471 | A1 | 10/2011 | Wheeler et al. | |
| 2011/0247934 | A1 | 10/2011 | Wang et al. | |
| 2011/0293851 | A1 | 12/2011 | Bollström et al. | |
| 2011/0303542 | A1 | 12/2011 | Srinivasan et al. | |
| 2011/0311980 | A1 | 12/2011 | Pollack et al. | |
| 2012/0000777 | A1 | 1/2012 | Garrell et al. | |
| 2012/0045748 | A1 | 2/2012 | Willson et al. | |
| 2012/0045768 | A1 | 2/2012 | Arunachalam et al. | |
| 2012/0149018 | A1 | 6/2012 | Dahlberg et al. | |
| 2012/0190027 | A1 | 7/2012 | Loeffert et al. | |
| 2012/0259233 | A1 | 10/2012 | Chan et al. | |
| 2012/0261264 | A1 | 10/2012 | Srinivasan et al. | |
| 2012/0289581 | A1 | 11/2012 | Chang et al. | |
| 2012/0325665 | A1 | 12/2012 | Chiou et al. | |
| 2013/0017544 | A1 | 1/2013 | Eckhardt et al. | |
| 2013/0018611 | A1 | 1/2013 | Sturmer | |
| 2013/0062205 | A1 | 3/2013 | Hadwen et al. | |
| 2013/0105318 | A1 | 5/2013 | Bhattacharya et al. | |
| 2013/0157259 | A1 | 6/2013 | Choi et al. | |
| 2013/0168250 | A1 | 7/2013 | Fogleman et al. | |
| 2013/0171546 | A1 | 7/2013 | White et al. | |
| 2013/0177915 | A1 | 7/2013 | Too et al. | |
| 2013/0203606 | A1 | 8/2013 | Pollack et al. | |
| 2013/0215492 | A1 | 8/2013 | Steckl et al. | |
| 2013/0217113 | A1 | 8/2013 | Srinivasan et al. | |
| 2013/0225450 | A1 | 8/2013 | Pollack et al. | |
| 2013/0284956 | A1 | 10/2013 | Kwon | |
| 2013/0288254 | A1 | 10/2013 | Pollack et al. | |
| 2013/0293246 | A1 | 11/2013 | Pollack et al. | |
| 2013/0306480 | A1 | 11/2013 | Chang et al. | |
| 2014/0005066 | A1 | 1/2014 | Boles et al. | |
| 2014/0054174 | A1 | 2/2014 | Wang | |
| 2014/0124037 | A1 | 5/2014 | Foley | |
| 2014/0141409 | A1 | 5/2014 | Foley et al. | |
| 2014/0161686 | A1 | 6/2014 | Bort et al. | |
| 2014/0174926 | A1 | 6/2014 | Bort et al. | |
| 2014/0179539 | A1 | 6/2014 | Lohman et al. | |
| 2014/0216559 | A1 | 8/2014 | Foley | |
| 2014/0273100 | A1 | 9/2014 | Saito et al. | |
| 2014/0335069 | A1 | 11/2014 | Graham et al. | |
| 2015/0001078 | A1 | 1/2015 | Feiglin | |
| 2015/0021182 | A1 | 1/2015 | Rival et al. | |
| 2015/0075986 | A1 | 3/2015 | Cyril et al. | |
| 2015/0111237 | A1 | 4/2015 | Graham et al. | |
| 2015/0144489 | A1 | 5/2015 | Hoffmeyer et al. | |
| 2015/0205272 | A1 | 7/2015 | Yi et al. | |
| 2015/0212043 | A1 | 7/2015 | Pollack | |
| 2015/0258520 | A1 | 9/2015 | Griffiths et al. | |
| 2015/0267242 | A1 | 9/2015 | Foegeding et al. | |
| 2016/0068901 | A1 | 3/2016 | Eckhardt et al. | |
| 2016/0074863 | A1 | 3/2016 | Sturmer et al. | |
| 2016/0108432 | A1 | 4/2016 | Punnamaraju et al. | |
| 2016/0116438 | A1 | 4/2016 | Pamula et al. | |
| 2016/0129437 | A1 | 5/2016 | Kayyem et al. | |
| 2016/0161343 | A1 | 6/2016 | Smith et al. | |
| 2016/0175859 | A1 | 6/2016 | Yi et al. | |
| 2016/0199832 | A1 | 7/2016 | Jamshidi et al. | |
| 2016/0319354 | A1 | 11/2016 | Tocigl et al. | |
| 2016/0370317 | A9 | 12/2016 | Sudarsan et al. | |
| 2017/0315090 | A1 | 11/2017 | Wheeler et al. | |
| 2018/0120335 | A1 | 5/2018 | Mousa et al. | |
| 2018/0141049 | A1 | 5/2018 | Jebrail et al. | |
| 2018/0178217 | A1 | 6/2018 | Jebrail et al. | |
| 2019/0210026 | A1 | 7/2019 | Jebrai et al. | |

FOREIGN PATENT DOCUMENTS

| | | | |
|---|---|---|---|
| CN | 101609063 | A | 12/2009 |
| CN | 102549804 | A | 7/2012 |
| CN | 102719526 | A | 10/2012 |
| CN | 103014148 | A | 4/2013 |
| CN | 103170383 | A | 6/2013 |
| EP | 2111554 | B1 | 5/2013 |
| GB | 2533952 | A | 7/2016 |
| JP | 2002321449 | A | 11/2002 |
| JP | 2006220606 | A | 8/2006 |
| JP | 2010098133 | A | 4/2010 |
| JP | 2010515877 | A | 5/2010 |
| JP | 2010180222 | A | 8/2010 |
| JP | 2012525687 | A | 10/2012 |
| WO | WO2000/067907 | A2 | 11/2000 |
| WO | WO2001/025137 | A1 | 4/2001 |
| WO | WO2003/045556 | A2 | 6/2003 |
| WO | WO2004/074169 | A1 | 9/2004 |
| WO | WO2005/068993 | A1 | 7/2005 |
| WO | WO2005/118129 | A1 | 12/2005 |
| WO | WO2006/000828 | A2 | 1/2006 |
| WO | WO2006/102309 | A2 | 9/2006 |
| WO | WO2007/120240 | A2 | 10/2007 |
| WO | WO2007/123908 | A2 | 11/2007 |
| WO | WO2007/130294 | A2 | 11/2007 |
| WO | WO2007/136386 | A2 | 11/2007 |
| WO | WO2008/066828 | A2 | 6/2008 |
| WO | WO2009/026339 | A2 | 2/2009 |
| WO | WO2009/052348 | A2 | 4/2009 |
| WO | WO2009/111723 | A1 | 9/2009 |
| WO | WO2009/111769 | A2 | 9/2009 |
| WO | WO2009/140671 | A2 | 11/2009 |
| WO | WO2010/003188 | A1 | 1/2010 |
| WO | WO2010/006166 | A2 | 1/2010 |
| WO | WO2010/027894 | A2 | 3/2010 |
| WO | WO2010/042637 | A2 | 4/2010 |
| WO | WO2010/069977 | A1 | 6/2010 |
| WO | WO2010/091334 | A2 | 8/2010 |
| WO | WO2010/111265 | A1 | 9/2010 |
| WO | WO2011/002957 | A2 | 1/2011 |
| WO | WO2011/062557 | A1 | 5/2011 |
| WO | WO2012/172172 | A1 | 12/2012 |
| WO | WO2013/006312 | A2 | 1/2013 |
| WO | WO2013/040562 | A2 | 3/2013 |
| WO | WO2013/090889 | A1 | 6/2013 |
| WO | WO2013/096839 | A1 | 6/2013 |
| WO | WO2013/116039 | A1 | 8/2013 |
| WO | WO2013/176767 | A1 | 11/2013 |
| WO | WO2014/078100 | A1 | 5/2014 |
| WO | WO2014/100473 | A1 | 6/2014 |
| WO | WO2014/106167 | A1 | 7/2014 |
| WO | WO2014/108185 | A1 | 7/2014 |
| WO | WO2014/183118 | A1 | 11/2014 |
| WO | WO2015/023745 | A1 | 2/2015 |

(56) References Cited

FOREIGN PATENT DOCUMENTS

WO WO2015/172256 A1 11/2015
WO WO2017/223026 A1 12/2017
WO WO2018/126082 A1 7/2018
WO WO2018/187476 A1 10/2018
WO WO2019/023133 A1 1/2019

OTHER PUBLICATIONS

Analog Devices, Manufacturer Specifications: Extending the Capacitive Input Range of AD7745/AD7746. Analog Devices: Norwood (MA), 2009 (Year: 2009).*
Analog Devices, 24-Bit Capacitance-to-Digital Converter with Temperature sensor, AD7745/AD7746, Analog Devices: Norwood ( MA), 2005 (Year: 2005).*
Ren et al., "Automated on-chip droplet dispensing with volume control by electro-wetting actuation and capacitance metering", Sensors and Actuators B 98 (2004) 319-327 (Year: 2004).*
Dryden et al.; Integrated digital microfluidic platform for voltammetric analysis; Analytical Chemistry; 85(18); pp. 8809-8816; Sep. 2013.
He et al. (ed); Food microbiological inspection technology; Chapter 5: Modern food microbiological inspection technology; China Quality Inspection press; pp. 111-113; (English Translation included) Nov. 2013.
Abdelgawad et al., All-terrain droplet actuation, Lab on a Chip, 8(5), pp. 672-677, May 2008.
Abdelgawad et al.; Low-cost, rapid-prototyping of digital microfluidics devices, Microfluidics and Nanofluidics, 4, pp. 349-355, Apr. 2008.
Abdelgawad et al.; Rapid prototyping in copper substrates for digital microfluidics, Adv. Mater., 19(1), pp. 133-137; Jan. 2007.
Abdelgawad et al; Hybrid microfluidics: a digital-to-channel interface for in-line sample processing and chemical separations, Lab on a Chip, 9(8), pp. 1046-1051, Apr. 2009.
Abdelgawad; Digital Microfluidics for Integration of Lab-on-a-Chip Devices (Doctoral dissertation); University of Toronto;© 2009.
Albrecht et al.; Laboratory testing of gonadal steroids in children; Pediatric Endocrinology Reviews; 5(suppl 1); pp. 599-607; Oct. 2007.
Ankarberg-Lindren et al.; A purification step prior to commercial sensitive immunoassay is necessary to achieve clinical usefulness when quantifying serum 17 ?-estradiol in prepubertal children. Eur J Endocrinol, 158, pp. 117-124, Jan. 2008.
Armstrong et al.; A study of plasma free amino acid levels. II. Normal values for children and adults, Metabolism, 22(4), pp. 561-569, Apr. 1973.
Asiello et al.; Miniaturized isothermal nucleic acid amplification, a review; Lab Chip; 11(8); pp. 1420-1430; Apr. 2011.
Au et al., Integrated microbioreactor for culture and analysis of bacteria, algae and yeast, Biomedical Microdevices, 13(1), pp. 41-50, Feb. 2011.
Au et al.; A new angle on pluronic additives: Advancing droplets and understanding in digital microfluidics; Langmuir; 27; pp. 8586-8594; Jun. 2011.
Banatvala et al., Rubella, The Lancet, 363(9415), pp. 1127-1137, Apr. 2004.
Banér et al.; Signal amplification of padlock probes by rolling circle replication; Nuc. Acids Res.; 26(22); pp. 5073-5078; Nov. 1998.
Barany; Genetic disease detection and DNA amplification using cloned thermostable ligase; PNAS; 88(1); pp. 189-193; Jan. 1991.
Barbulovic-Nad et al., A microfluidic platform for complete mammalian cell culture, Lab on a Chip, 10(12), pp. 1536-1542; Jun. 2010.
Barbulovic-Nad et al.; Digital microfluidics for cell-based assays, Lab Chip, 8(4), pp. 519-526; Apr. 2008.
Beattie et al.; Endogenous sex hormones, breast cancer risk, and tamoxifen response: an ancillary study in the NSABP Breast Cancer Prevention Trial P-1, J Natl Cancer Inst, 98(2), pp. 110-115, Jan. 2006.
Beaucage et al., The Functionalization of Oligonucleotides Via Phosphoramidite Derivatives,Tetrahedron, 49(10), pp. 1925-1963, Mar. 1993.
Belanger et al.; Omental and subcutaneous adipose tissue steroid levels in obese men. Steroids, 71(8), pp. 674-682, Aug. 2006.
Bergkvist et al., Improved chip design for integrated solid-phase microextraction in on-line proteomic sample preparation, Proteomics, 2(4), pp. 422-429, Apr. 2002.
Bi et al.; Dumbbell probe-mediated cascade isothermal amplification: A novel strategy for label-free detection of microRNAs and its application to real sample assay; Analytica Chimica Acta; 760; pp. 69-74; Jan. 2013.
Blankenstein et al.; Intratumoral levels of estrogens in breast cancer. J Steroid Biochem Mol Biol, 69(1-6), pp. 293-297, Apr.-Jun. 1999.
Bodamer et al.; Expanded newborn screening in Europe, Journal of Inherited Metabolic Disease, 30(4), pp. 439-444, Aug. 2007.
Bohlen et al.; Fluorometric assay of proteins in the nanogram range, Archives of Biochemistry and Biophysics, 155(1), pp. 213-220, Mar. 1973.
Bollström et al.; A Multilayer Coated Fiber-Based Substrate Suitable for Printed Functionality; Organic Electronics; 10(5); pp. 1020-1023; Aug. 2009.
Bonneil et al., Integration of solid-phase extraction membranes for sample multiplexing: Application to rapid protein identification from gel-isolated protein extracts, Electrophoresis, 23(20), pp. 3589-3598, Oct. 2002.
Brassard et al.; Water-oil core-shell droplets for electrowetting-based digital microfluidic devices; Lab Chip; 8(8); pp. 1342-1349; Aug. 2008.
Brill et al., Synthesis of oligodeoxynucleoside phosphorodithioates via thioamidites, J. Am. Chem. Soc., 111(6), pp. 2321-2322, Mar. 1989.
Brivio et al.; Integrated microfluidic system enabling (bio)chemical reactions with on-line MALDI-TOF mass spectrometry, Anal. Chem., 74(16), pp. 3972-3976, Aug. 2002.
Burstein; Aromatase inhibitor-associated arthralgia syndrome. Breast, 16(3), pp. 223-234, Jun. 2007.
Carlsson et al., Screening for genetic mutations, Nature, 380(6571), pp. 207, Mar. 1996.
Chace et al.; A biochemical perspective on the use of tandem mass spectrometry for newborn screening and clinical testing, Clinical Biochemistry, 38(4), pp. 296-309; Apr. 2005.
Chace et al.; Rapid diagnosis of maple syrup urine disease in blood spots from newborns by tandem mass spectrometry, Clinical Chemistry, 41(1), pp. 62-68, Jan. 1995.
Chace et al.; Rapid diagnosis of phenylketonuria by quantitative analysis for phenylalanine and tyrosine in neonatal blood spots by tandem mass spectrometry, Clinical Chemistry, 39(1), pp. 66-71; Jan. 1993.
Chace et al.; Use of tandem mass spectrometry for multianalyte screening of dried blood specimens from newborns, Clinical Chemistry, 49(11), pp. 1797-1817, Nov. 2003.
Chace; Mass spectrometry in newborn and metabolic screening: historical perspective and future directions, Journal of Mass Spectrometry, 44(2), pp. 163-170, Feb. 2009.
Chang et al.; Integrated polymerase chain reaction chips utilizing digital microfluidics; Biomedical Microdevices; 8(3); pp. 215-225; Sep. 2006.
Chatterjee et al.; Droplet-based microfluidics with nonaqueous solvents and solutions, Lab Chip, 6(2), pp. 199-206, Feb. 2006.
Chen et al.; Selective Wettability Assisted Nanoliter Sample Generation Via Electrowetting-Based Transportation; Proceedings of the 5th International Conference on Nanochannels, Microchannels and Minichannels (ICNMM); Puebla, Mexico; Paper No. ICNMM2007-30184; pp. 147-153; Jun. 18-20, 2007.
Cheng et al., Paper-Based ELISA, Angewandte Chemie, 49(28), pp. 4771-4774, Jun. 2010.

(56) References Cited

OTHER PUBLICATIONS

Cheng et al.; Highly Sensitive Determination of microRNA Using Target-Primed and Branched Rolling-Circle Amplification; Angew. Chem.; 121(18); pp. 3318-3322; Apr. 2009.
Chetrite et al.; Estradiol inhibits the estrone sulfatase activity in normal and cancerous human breast tissues. Journal of Steroid Biochemistry and Molecular Biology, 104(3-5), pp. 289-292, May 2007.
Cho et al.; Creating, transporting, cutting, and merging liquid droplets by electrowetting-based actuation for digital microfluidic circuits, J. MEMS 2003, 12(1), pp. 70-80, Feb. 2003.
Choi et al., Automated digital microfluidic platform for magnetic-particle-based immunoassays with optimization by design of experiments, Anal. Chem., 85(20), pp. 9638-9646; Oct. 2013.
Choi et al., Digital Microfluidics, Annu. Rev. Anal. Chem., 5, pp. 413-440, (Epub) Apr. 2012.
Christiansen; Hormone Replacement Therapy and Osteoporosis; Maturitas, 23, Suppl. pp. S71-S76, May 1996.
Chuang et al.; Direct Handwriting Manipulation of Droplets by Self-Aligned Mirror-EWOO Across a Dielectric Sheet; 19th IEEE International Conf. on Micro Electro Mechanical Systems (MEMS); Instanbul, Turkey; pp. 538-541; Jan. 22-26, 2006.
Cipriano et al.; The cost-effectiveness of expanding newborn screening for up to 21 inherited metabolic disorders using tandem mass spectrometry: results from a decision-analytic model, Value in Health, 10(2), pp. 83-97, Mar.-Apr. 2007.
Cooney et al.; Electrowetting droplet microfluidics on a single planar surface, Microfluid. Nanofluid., 2(5), pp. 435-446; Sep. 2006.
Coregenomics; How do SPRI beads work; 31 pages; retrieved from the internet (http://core-genomics.blogspot.com/2012/04/how-do-spri-beads-work.html); Apr. 28, 2012.
Crabtree et al.; Microchip injection and separation anomalies due to pressure effects, Anal. Chem., 73(17), pp. 4079-4086, Sep. 2001.
Cunningham; Testosterone replacement therapy for late-onset hypogonadism. Nature Clinical Practice Urology, 3(5), pp. 260-267, May 2006.
Cuzick; Chemoprevention of breast cancer. Women's Health, 2(6), pp. 853-861, Nov. 2006.
Dahlin et al.; Poly(dimethylsiloxane)-based microchip for two-dimensional solid-phase extraction-capillary electrophoresis with an integrated electrospray emitter tip, Anal. Chem., 77(16), pp. 5356-5363, Aug. 2005.
Danton et al.; Porphyrin profiles in blood, urine and faeces by HPLC/electrospray ionization tandem mass spectrometry. Biomedical Chromatography, 20(6-7), pp. 612-621, Jun.-Jul. 2006.
De Mesmaeker et al.; Comparison of rigid and flexible backbones in antisense oligonucleotides; Bioorganic & Medicinal Chem. Lett; 4(3); pp. 395-398; Feb. 1994.
Deligeorgiev et al.; Intercalating Cyanine Dyes for Nucleic Acid Detection; Recent Pat Mat Sci; 2(1); pp. 1-26; Jan. 2006.
Dempcy et al., Synthesis of a thymidyl pentamer of deoxyribonucleic guanidine and binding studies with DNA homopolynucleotides, Proc. Natl. Acad. Sci., 92(13), pp. 6097-6101, Jun. 1995.
Deng et al.; Rapid determination of amino acids in neonatal blood samples based on derivatization with isobutyl chloroformate followed by solid-phase microextraction and gas chromatography/mass spectrometry. Rapid Communications in Mass Spectrometry, 18(1), pp. 2558-2564, Nov. 2004.
Denneulin et al.; Infra-red assisted sintering of inkjet printed silver tracks on paper substrates; J Nanopart Res; 13(9); pp. 3815-3823; Sep. 2011.
Dibbelt et al.; Determination of natural and synthetic estrogens by radioimmunoassay: Comparison of direct and extraction methods for quantification of estrone in human serum. Clinical Laboratory, 44(3), 137-143, Mar. 1998.
Dietzen et al.; National academy of clinical biochemistry laboratory medicine practice guidelines: follow-up testing for metabolic disease identified by expanded newborn screening using tandem mass spectrometry; executive summary, Clinical Chemistry, 55(9), pp. 1615-1626, Sep. 2009.
Diver et al.; Warning on plasma oestradiol measurement. Lancet, 330(8567), p. 1097, Nov. 1987.
Divino Filho et al.; Simultaneous measurements of free amino acid patterns of plasma, muscle and erythrocytes in healthy human subjects, Clinical Nutrition, 16(6), pp. 299-305, Dec. 1997.
Djerassi; Chemical birth of the pill. American Journal of Obstetrics and Gynecology, 194(1), pp. 290-298, Jan. 2006.
Dobrowolski et al.; DNA microarray technology for neonatal screening, Acta Paediatrica Suppl, 88(432), pp. 61-64, Dec. 1999.
Dong et al.; Highly sensitive multiple microRNA detection based on flourescence quenching of graphene oxide and isothermal strand-displacement polymerase reaction; Anal Chem; 84; pp. 4587-4593; Apr. 2012.
Duffy et al.; Rapid prototyping of microfluidic systems in Poly (dimethylsiloxane), Anal. Chem., 70(23), pp. 4974-4984, Dec. 1998.
Edgar et al.; Capillary electrophoresis separation in the presence of an immiscible boundary for droplet analysis, Anal. Chem., 78(19), pp. 6948-6954 (author manuscript, 15 pgs.), Oct. 2006.
Egholm et al., PNA hybridizes to complementary oligonucleotides obeying the Watson-Crick hydrogen-bonding rules, Nature, 365(6446), pp. 566-568, Oct. 1993.
Egholm et al., Recognition of guanine and adenine in DNA by cytosine and thymine containing peptide nucleic acids (PNA), J. Am. Chem. Soc., 114(24), pp. 9677-9678; Nov. 1992.
Ehrmann; Polycystic ovary syndrome. New England Journal of Medicine; 352(12); pp. 1223-1236; Mar. 2005.
Ekstrom et al., Miniaturized solid-phase extraction and sample preparation for MALDI MS using a microfabricated integrated selective enrichment target, Journal of Proteome Research, 5(5), pp. 1071-1081, May 2006.
Ekstrom et al., Polymeric integrated selective enrichment target (ISET) for solid-phase-based sample preparation in MALDI-TOF MS, Journal of Mass Spectrometry, 42(11), pp. 1445-1452, Nov. 2007.
Ekstrom et al.,On-chip microextraction for proteomic sample preparation of in-gel digests, Proteomics, 2(4), pp. 413-421, Apr. 2002.
El-Ali et al.; Cells on chips; Nature (2006) insight Review; 442(7101); pp. 403-411; Jul. 2006.
Fair; Digital microfluidics: Is a true lab-on-a-chip possible?; Microfuid. Nanofluid.; 3(3); pp. 245-281; Jun. 2007.
Falk et al.; Measurement of Sex Steroid Hormones in Breast Adipocytes: Methods and Implications; Cancer Epidemiol Biomarkers Prev; 17(8); pp. 1891-1895; Aug. 2008.
Fan et al.; Cross-scale electric manipulations of cells and droplets by frequency-modulated dielectrophoresis and electrowetting; Lab Chip; 8(8); pp. 1325-1331; Aug. 2008.
Fan et al.; Electrically Programmable Surfaces for Configurable Patterning of Cells; Advanced Materials; 20(8); pp. 1418-1423; Apr. 2008.
Fobel et al.; DropBot: An open-source digital microfluidic control system with precise control of electrostatic driving force and instantaneous drop velocity measurement; Applied Physics Letters; 102(19); 193513 (5 pgs.); May 2013.
Foote et al., Preconcentration of proteins on microfluidic devices using porous silica membranes, Analytical Chemistry, 77(1), pp. 57-63, Jan. 2005.
Freire et al.; A practical interface for microfluidics and nanoelectrospray mass spectrometry, Electrophoresis, 29(9), pp. 1836-1843, May 2008.
Fridley et al., Controlled release of dry reagents in porous media for tunable temporal and spatial distribution upon rehydration, Lab Chip, 12(21), pp. 4321-4327 (author manuscript, 14 pgs.), Nov. 2012.
Fu et al., Controlled Reagent Transport in Disposable 2D Paper Networks, Lab. Chip, 10(7), pp. 918-920 (author manuscript, 9 pgs.), Apr. 2010.
Gao et al.; Unusual conformation of a 3'-thioformacetal linkage in a DNA duplex; J. Biomol. NMR; 4(1); pp. 17-34; Jan. 1994.

(56) References Cited

OTHER PUBLICATIONS

Gentili et al.; Analysis of free estrogens and their conjugates in sewage and river waters by solid-phase extraction then liquid chromatography-electrospray-tandem mass spectrometry. Chromatographia 56(1), pp. 25-32, Jul. 2002.
Gerasimova et al.; Fluorometric method for phenylalanine microplate assay adapted for phenylketonuria screening, Clinical Chemistry, 35(10), pp. 2112-2115, Oct. 1989.
Gong et al., All-Electronic Droplet Generation On-Chip With Real-Time Feedback Control for EWOD Digital Microfluidics, Lab Chip, 8(6), pp. 898-906 (author manuscript, 20 pgs.), Jun. 2008.
Gong et al.; Portable digital microfluidics platform with active but disposable lab-on-chip; 17th IEEE International Conference on Micro Electro Mechanical Systems; Maastricht, Netherlands; pp. 355-358; Jan. 24-29, 2004.
Gong et al.; Two-dimensional digital microfluidic system by multilayer printed circuit board, 18th IEEE International Conference on Micro Electro Mechanical Systems (MEMS 2005); IEEE; pp. 726-729; Jan. 30-Feb. 3, 2005.
Goto et al.; Colorimetric detection of loop-mediated isothermal amplification reaction by using hydroxy naphthol blue; Biotechniques; 46(3); pp. 167-172; Mar. 2009.
Gottschlich et al.; Integrated microchip-device for the digestion, separation and postcolumn labeling of proteins and peptides, J. Chromatogr. B, 745(1), pp. 243-249, Aug. 2000.
Govindarajan et al., A low cost point-of-care viscous sample preparation device for molecular diagnosis in the developing world; an example of microfluidic origami, Lab Chip, 12(1), pp. 174-181, Jan. 2012.
Green et al.; Neonatal screening by DNA microarray: spots and chips, Nature Reviews Genetics, 6(2), pp. 147-151, Feb. 2005.
Hatch et al., Integrated preconcentration SDA-PAGE of proteins in microchips using photopatterned cross-linked polyacrylamide gels, Analytical Chemistry, 78(14), pp. 4976-4984, Jul. 2006.
Henderson et al.; Estrogens as a cause of human cancer: The Richard and Hinda Rosenthal Foundation award lecture. Cancer Res, 48(2), pp. 246-253, Jan. 1988.
Herdewijn et al.; 2'-5'-Oligoadenylates (2-5A) as Mediators of Interferon Action. Synthesis and Biological Activity of New 2-5A Analogues. E. De Clerq (ed.) Frontiers in Microbiology, 231-232, Springer, Dordrecht Jan. 1987.
Hertz et al.; Estrogen-progestogen combinations for contraception. Journal of the American Medical Association, 198(9), pp. 1000-1006, Nov. 1966.
Hong et al.; Three-dimensional digital microfluidic manipulation of droplets in oil medium; Scientific Reports; 5 (Article No. 10685); 5 pgs.; Jun. 2015.
Horn et al.; Oligonucleotides with alternating anionic and cationic phosphoramidate linkages: Synthesis and hybridization of stereo-uniform isomers; Tetrahedron Lett.; 37(6); pp. 743-746; Feb. 1996.
Hou et al.; Microfluidic devices for blood fractionation; Micromachines; 2(3); pp. 319-343; Jul. 20, 2011.
Huh et al.; Reversible Switching of High-Speed Air-Liquid Two-Phase Flows Using Electrowetting-Assisted Flow-Pattern Change, J. Am. Chem. Soc., 125, pp. 14678-14679; Dec. 2003.
Ihalainen et al; Application of paper-supported printed gold electrodes for impedimetric immunosensor development; Biosensors; 3(1); pp. 1-17; Mar. 2013.
Jacobson et al.; High-Speed Separations on a Microchip, Anal. Chem., 66(7), pp. 1114-1118, Apr. 1994.
Jacobson et al.; Precolumn Reactions with Electrophoretic Analysis Integrated on a Microchip, Anal. Chem., 66(23), pp. 4127-4132, Dec. 1994.
Jebrail et al., Combinatorial Synthesis of Peptidomimetics Using Digital Microfluidics, J. Flow Chem., 2(3), pp. 103-107; (online) Aug. 2012.
Jebrail et al., Let's get digital: digitizing chemical biology with microfluidics, Curr. Opin. Chem. Biol., 14(5), 574-581, Oct. 2010.
Jebrail et al., Synchronized synthesis of peptide-based macrocycles by digital microfluidics, Angew. Chem. Int. Ed. Eng., 49(46), pp. 8625-8629, Nov. 2010.
Jebrail et al., World-to-digital-microfluidic interface enabling extraction and purification of RNA from human whole blood, Analytical Chemistry, 86(8), pp. 3856-3862, Apr. 2014.
Jebrail et al.; A Solvent Replenishment Solution for Managing Evaporation of Biochemical Reactions in Air-Matrix Digital Microfluidics Devices, Lab on a Chip, 15(1), pp. 151-158; Jan. 2015.
Jebrail et al.; Digital Microfluidic Method for Protein Extraction by Precipitation; Analytical Chemistry; 81(1); pp. 330-335; Jan. 2009.
Jebrail et al.; Digital Microfluidics for Automated Proteomic Processing, Journal of Visualized Experiments, 33 (e1603), 5 pgs., Nov. 2009.
Jebrail et al.; Digital microfluidics: a versatile tool for applications in chemistry, biology and medicine; Lab Chip; 12 (14); pp. 2452-2463; Jul. 2012.
Jemere et al., An integrated solid-phase extraction system for sub-picomolar detection, Electrophoresis, 23(20), pp. 3537-3544, Oct. 2002.
Jenkins et al., The biosynthesis of carbocyclic nucleosides; Chem. Soc. Rev.; 24(3); pp. 169-176; Jan. 1995.
Jessome et al.; Ion Suppression: A Major Concern in Mass Spectrometry. LC-GC North America, 24(5), pp. 498-510, May 2006.
Jia et al.; Ultrasensitive detection of microRNAs by exponential isothermal amplification; Angew. Chem. Int. Ed. Engl.; 49(32); pp. 5498-5501; Jul. 2010.
Jung et al.; Hybridization of Alternating Cationic/Anionic Oligonucleotides to RNA Segments; Nucleosides & Nucleotides; 13(6-7); pp. 1597-1605; Jul. 1994.
Kaaks et al.; Postmenopausal serum androgens, oestrogens and breast cancer risk: The European prospective investigation into cancer and nutrition. Endocrine-Related Cancer,12(4), pp. 1071-1082, Dec. 2005.
Keng et al., Micro-chemical synthesis of molecular probes on an electronic microfluidic device,PNAS, 109(3), pp. 690-695; Jan. 2012.
Kiedrowski et al., Parabolic Growth of a Self-Replicating Hexadeoxynucleotide Bearing a 3'-5'-Phosphoamidate Linkage; Angew. Chemie Intl. Ed.; 30(4); pp. 423-426; Apr. 1991.
Kim et al., A Microfluidic DNA Library Preparation Platform for Next-Generation Sequencing, PLoS ONE, 8(7), Article ID: e68988; 9 pgs., Jul. 2013.
Kim et al.; Microfabricated Monolithic Multinozzle Emitters for Nanoelectrospray Mass Spectrometry; Anal Chem; 79(10); pp. 3703-3707; May 2007.
Kralj et al.; Integrated continuous microfluidic liquid-liquid extraction. Lab on a Chip, 7(2), pp. 256-263, Feb. 2007.
Kutter et al., Solid phase extraction on microfluidic devices, Journal of Microcolumn Separations,12(2), pp. 93-97, Jan. 2000.
Kutter et al., Solvent-Programmed Microchip Open-Channel Electrochromatography, Analytical Chemistry, 70(15), pp. 3291-3297, Aug. 1998.
Labrie et al.; Androgen glucuronides, instead of testosterone, as the new markers of androgenic activity in women. The Journal of Steroid Biochemistry and Molecular Biology, 99(4-5), pp. 182-188, Jun. 2006.
Labrie; Intracrinology. Molecular and Cellular Endocrinology, 78(3), pp. C113-C118, Jul. 1991.
Lamar et al.; Serum sex hormones and breast cancer risk factors in postmenopausal women. Cancer Epidemiol Biomarkers Prev, 12(4), pp. 380-383, Apr. 2003.
Langevin et al., A rapid and unbiased method to produce strand-specific RNA-Seq libraries from small quantities of starting materiaRNA Biol., 10(4), pp. 502-515, (online) Apr. 2013.
Lawyer et al.; High-level expression, purification, and enzymatic characterization of full-length Thermus aquaticus DNA polymerase and a truncated form deficient in 5' to 3' exonuclease activity; Genome Res; 2(4); pp. 275-287; May 1993.
Lawyer et al.; Isolation, characterization, and expression in *Escherichia coli* of the DNA polymerase gene from Thermus aquaticus; J. Biol. Chem.; 264; pp. 6427-6437; Apr. 1989.

(56) References Cited

OTHER PUBLICATIONS

Lebrasseur et al.; Two-dimensional electrostatic actuation of droplets using a single electrode panel and development of disposable plastic film card; Sensors and Actuators A; 136(1); pp. 368-386; May 2007.
Lee et al.; Electrowetting and electrowetting-on-dielectric for microscale liquid handling, Sens. Actuators A, 95(2), pp. 259-268, Jan. 2002.
Lee et al.; Removal of bovine serum albumin using solid-phase extraction with in-situ polymerized stationary phase in a microfluidic device; Journal of Chromatography A; 1187(1-2); pp. 11-17; Apr. 2008.
Lee et al.; Surface-Tension-Driven Microactuation Based on Continuous Electrowetting; J. Microelectromechanical Systems; 9(2); pp. 171-180; Jun. 2000.
Letsinger et al., Cationic oligonucleotides, J. Am. Chem. Soc., 110(13), pp. 4470-4471, Jun. 1988.
Letsinger et al., Effects of pendant groups at phosphorus on binding properties of d-ApA analogues, Nucl. Acids Res., 14(8), pp. 3487-3499, Apr. 1986.
Letsinger et al., Phosphoramidate analogs of oligonucleotides, J. Org. Chem., 35(11), pp. 3800-3803, Nov. 1970.
Lettieri et al., A novel microfluidic concept for bioanalysis using freely moving beads trapped in recirculating flows, Lab on a Chip, 3(1), pp. 34-39, Feb. 2003.
Levy et al.; Genetic screening of newborns, Annual Review of Genomics and Human Genetics, 1, pp. 139-177, Sep. 2000.
Li et al., A perspective on paper-based microfluidics: Current status and future trends, Biomicrofluidics, 6(1), pp. 011301 (13 pgs), Mar. 2012.
Li et al., Application of microfluidic devices to proteomics research: identification of trace-level protein digests and affinity capture of target peptides, Molecular & cellular Proteomics,16(2), pp. 157-168, Feb. 2002.
Li et al., Paper-based microfluidic devices by plasma treatment, Anal. Chem., 80(23), pp. 9131-9134, Nov. 2008.
Li et al.; One-step ultrasensitive detection of microRNAs with loop-mediated isothermal amplification (LAMP); Chem Commun; 47(9); pp. 2595-2597; Mar. 2011.
Li et al.; Test structure for characterizing low voltage coplanar EWOD system; IEEE Transaction on Semiconductor Manufacturing; IEEE Service Center; Piscataway, NJ.; 22(1); pp. 88-95; Feb. 4, 2009.
Liana et al.; Recent Advances in Paper-Based Sensors; Sensors; 12(9); pp. 11505-11526; Aug. 2012.
Link et al.; Electric Control of Droplets in Microfluidic Devices; Angew Chem Int Ed Engl; 45(16); pp. 2556-2560; Apr. 2006.
Liu et al., Three-dimensional paper microfluidic devices assembled using the principles of origami, JACS, 133(44), pp. 17564-17566, Nov. 2011.
Liu et al.; Attomolar ultrasensitive microRNA detection by DNA-scaffolded silver-nanocluster probe based on isothermal amplification; Anal Chem; 84(12); pp. 5165-5169; Jun. 2012.
Lizardi et al.; Mutation detection and single-molecule counting using isothermal rolling-circle amplification; Nat. Genet.; 19(3); pp. 225-232; Jul. 1998.
Locascio et al.; Surface chemistry in polymer microfluidic systems; in Lab-on-a-Chip; Elsevier Science; 1st Ed.; pp. 65-82; Oct. 2003.
Loeber; Neonatal screening in Europe; the situation in 2004, Journal of Inherited Metabolic Disease, 30(4), pp. 430-438, Aug. 2007.
Lohman et al.; Efficient DNA ligation in DNA-RNA hybrid helices by Chlorella virus DNA ligase; Nucleic Acids Research; 42(3); pp. 1831-1844; Nov. 2013.
Luk et al.; Pluronic Additives: A Solution to Sticky Problems in Digital Microfluidics, Langmuir, 24(12), pp. 6382-6389, Jun. 2008.
Luk et al; A digital microfluidic approach to proteomic sample processing; Analytical Chemistry; 81(11); pp. 4524-4530; Jun. 2009.
Mag et al., Synthesis and selective cleavage of an oligodeoxynucleotide containing a bridged internucleotide 5'-phosphorothioate linkage, Nucleic Acids Res., 19(7), pp. 1437-1441, Apr. 1991.
Mais et al.; A solvent replenishment solution for managing evaporation of biochemical reactions in air-matrix digital microfluidics devices; Lab on a Chip; 15(1); pp. 151-158; Jan. 2015.
Makamba et al.; Surface modification of poly(dimethylsiloxane) microchannels; Electrophoresis; 24(21); pp. 3607-3619; Nov. 2003.
Malloggi et al.; Electrowetting—A versatile tool for controlling microdrop generation, Eur. Phys. J. E, 26(1), pp. 91-96, May 2008.
Mandl et al.; Newborn screening program practices in the United States: notification, research, and consent, Pediatrics, 109(2), pp. 269-273, Feb. 2002.
Maroney et al.; A Rapid, quantitative assay for direct detection of microRNAs and other small RNAs using splinted ligation; RNA; 13(6); pp. 930R936; Jun. 2007.
Maroney et al.; Direct detection of small RNAs using splinted ligation; Nat. Protocols3(2); pp. 279-287; Jan. 2008.
Martinez et al., Simple Telemedicine for Developing Regions: Camera Phones and Paper-Based Microfluidic Devices for Real-Time, Off-Site Diagnosis, Anal. Chem., 80(10), pp. 3699-3707, May 2008.
Martinez et al., Three-dimensional microfluidic devices fabricated in layered paper and tape, PNAS, 105(50), pp. 19606-19611, Dec. 2008.
Martinez et al.; Patterned paper as a platform for inexpensive low-volume, portable bioassays, Angewandte Chemie, 46(8), pp. 1318-1320, Feb. 2007.
Martinez-Sanchez et al.; MicroRNA Target Identification—Experimental Approaches; Biology; 2; pp. 189-205; Jan. 2013.
Matern et al.; Reduction of the false-positive rate in newborn screening by implementation of MS/MS-based second-tier tests: the Mayo Clinic experience (2004-2007), Journal of Inherited Metabolic Disease, 30(4), pp. 585-592, Aug. 2007.
Mauney, Thermal Considerations for Surface Mount Layouts, in Texas Instruments Portable Power Supply Design Seminar, 16 pgs., 2006.
Mega; Heterogenous ion-exchange membranes RALEX; 3 pgs.; retrieved Mar. 1, 2016 from the internet: http://www.mega.cz/heterogenous-ion-exchange-membranes-ralex.html.
Meier et al., The photochemistry of stilbenoid compounds and their role in materials technology, Chem. Int. Ed. Engl., 31(11), pp. 1399-1420, Nov. 1992.
Mellors et al.; Fully Integrated Glass Microfluidic Device for Performing High-Efficiency Capillary Electrophoresis and Electrospray Ionization Mass Spectrometry, Analytical Chemistry, 80(18), pp. 6881-6887 (Author Manuscript, 18 pgs.), Sep. 2008.
Michigan Dept. of Community Health; Specimen collection procedure from Michigan Newborn Screening Program, 37 pgs., (retrieved Feb. 9, 2017 online: http://web.archive.org/web/20100715000000*/http://www.michigan.gov/documents/Bloodco2_60773_7.pdf) Jul. 2009.
Miller et al.; A digital microfluidic approach to homogeneous enzyme assays, Anal. Chem., 80(5), pp. 1614-1619, Mar. 2008.
Millington et al.; Digital Microfluidics: A Future Technology in the Newborn Screening Laboratory?, Seminars in Perinatology, 34(2), pp. 163-169 (Author Manuscript, 14 pgs.), Apr. 2010.
Millington et al.; Digital Microfluidics: A novel platform for multiplexed detection of LSDs with potential for newborn screening (conference presentation); Oak Ridge Conference; 15 pgs.; 2009.
Millington et al.; Tandem mass spectrometry: a new method for acylcarnitine profiling with potential for neonatal screening for inborn errors of metabolism, Journal of Inherited Metabolic Disease, 13(3), pp. 321ý324, May 1990.
Millington et al.; The Analysis of Diagnostic Markers of Genetic Disorders in Human Blood and Urine Using Tandem Mass Spectrometry With Liquid Secondary Ion Mass Spectrometry, International Journal of Mass Spectrometry, 111, pp. 211-228, Dec. 1991.
Miralles et al.; A Review of Heating and Temperature Control in Microfluidic Systems: Techniques and Applications; Diagnostics; 3; pp. 33-67; Jan. 2013.
Mitchell et al.; Circulating microRNAs as stable blood-based markers for cancer detection; Proc Nat Acad Sci; 105(30); pp. 10513-10518; Jul. 2008.
Moon et al.; An integrated digital microfluidic chip for multiplexed proteomic sample preparation and analysis by MALDI-MS. Lab Chip, 6(9), pp. 1213-1219, Sep. 2006.

(56) References Cited

OTHER PUBLICATIONS

Moqadam et al.; The Hunting of Targets: Challenge in miRNA Research; Leukemia; 27(1); pp. 16-23; Jan. 2013.
Mousa et al.; Droplet-scale estrogen assays in breast tissue, blood, and serum, Science Translational Medicine, 1(1), 6 pgs., Oct. 2009.
Murran et al.; Capacitance-based droplet position estimator for digital microfluidic devices; Lab Chip;12(11); pp. 2053-2059; May 2012.
Nakamura et al.; Simple and accurate determination of CYP2D6 gene copy number by a loop-mediated isothermal amplification method and an electrochemical DNA chip; Clinica Chimica Acta; 411(7-8); pp. 568-573; Apr. 2010.
Nelson et al., Incubated protein reduction and digestion on an EWOD digital microfluidic chip for MALDI-MS, Analytical Chemistry, 82(23), pp. 9932-9937, Dec. 2010.
Newborn Screening Ontario, The newborn screening ontario unsatisfactory sample indicator (educational resource), 3 pgs., retrieved online: https://www.newbornscreening.on.ca/en/health-care-providers/submitters/report-cards/nso_unsatisfatory_sample_indicator_jan_2017, (web address was available to applicant(s) at least as of Jan. 2010).
Ng et al., Digital microfluidic magnetic separation for particle-based immunoassays, Anal. Chem., 84(20), 8805-8812, Oct. 2012.
Nilsson et al.; RNA-templated DNA ligation for transcript analysis; Nucl. Acid Res.; 29(2); pp. 578-581; Jan. 2001.
Njiru; Loop-Mediated Isothermal Amplification Technology: Towards Point of Care Diagnostics; PLoS; 6(6); pp. e1572 (4 pgs.); Jun. 2012.
Notomi et al.; Loop-mediated isothermal amplification of DNA; Nucleic Acid Research; 28(12); p. e63 (7 pgs.); Jun. 2000.
Okubo et al.; Liquid-liquid extraction for efficient synthesis and separation by utilizing micro spaces. Chemical Engineering Science, 63(16), pp. 4070-4077, Aug. 2008.
Oleschuk et al., Trapping of bead-based reagents within microfluidic systems: On-chip solid-phase extraction and electrochromatography, Analytical Chemistry, 72(3), pp. 585-590, Feb. 2000.
Padilla et al.; Newborn screening in the Asia Pacific region, Journal of Inherited Metabolic Disease, 30(4), pp. 490-506, Aug. 2007.
Paik et al., Coplanar digital microfluidics using standard printed circuit board processes, in Proceedings 9th Int'l Conf Miniaturized Systems for Chemistry and Life Sciences (MicroTAS 2005), Boston, MA, USA, pp. 566-568, Oct. 9-13, 2005.
Paneri et al.; Effect of change in ratio of electrode to total pitch length in EWOD based microfluidic system; InComputer Applications and Industrial Electronics (ICCAIE); 2010 International Conference; pp. 25-28; Dec. 5, 2010.
Parida et al.; Rapid detection and differentiation of Dengue virus serotypes by a real-time reverse transcription-loop-mediated isothermal amplification assay; J Clinical Microbiology; 43(6); pp. 2895-2903; Jun. 2005.
Pauwels et al., Biological-Activity of New 2-5a Analogs, Chemica Scripta, 26(1), pp. 141-145, Mar. 1986.
Peltonen et al.; Printed electrodes on tailored paper enable electrochemical functionalization of paper; TAPPI Nanotechnology Conference; Espoo, Finland; 20 pgs.; Sep. 2010.
Peterschmitt et al.; Reduction of false negative results in screening of newborns for homocystinuria, New England Journal of Medicine, 341(21), 1572-1576, Nov. 1999.
Petersen et al., On-chip electro membrane extraction, Microfluidics and Nanofluidics, 9(4), pp. 881-888, Oct. 2010.
Pitt et al.; Hormone replacement therapy for osteoporosis. Lancet, 335(8695), p. 978, Apr. 1990.
Pollack et al.; Electrowetting-based actuation of droplets for integrated microfluidics; Lab on a Chip; 2(2); pp. 96-101; May 2002.
Pollack et al.; Electrowetting-based actuation of liquid droplets for microfluidic applications, Appl. Phys. Lett., 77(11), pp. 1725-1726, Sep. 2000.
Provincial Health Services Authority (British Columbia Perinatal Health Program), Perinatal Services BC Neonatal Guideline 9: Newborn Screening, 29 pgs., (retrieved Feb. 9, 2017 online: http://www.perinatalservicesbc.ca/health-professionals/guidelines-standards/newborn) guideline revised: Dec. 2010.
Rahhal et al.; The impact of assay sensitivity in the assessment of diseases and disorders in children. Steroids, 73(13), pp. 1322-1327, Dec. 2008.
Rashad; Clinical applications of tandem mass spectrometry: ten years of diagnosis and screening for inherited metabolic diseases, Journal of Chromatography B: Biomedical Sciences and Applications, 758(1), pp. 27-48, Jul. 2001.
Rashed et al.; Diagnosis of inborn errors of metabolism from blood spots by acylcarnitines and amino acids profiling using automated electrospray tandem mass spectrometry, Pediatric Research, 38(3), 324-331, Sep. 1995.
Rawls, Optimistic About Antisense: Promising clinical results and chemical strategies for further improvements delight antisense drug researchers; Chemical & Engineering News; 75(22); pp. 35-39; Jun. 2, 1997.
Ren et al., Automated on-chip droplet dispensing with volume control by electro-wetting actuation and capacitance metering, Sens. Actuator B Chem., 98(2-3), pp. 319-327, Mar. 2004.
Ren et al.; Design and testing of an interpolating mixing architecture for electrowetting-based droplet-on-chip chemical dilution; 12th International Conference on Transducers, Solid-State Sensors, Actuators and Microsystems; vol. 2; Boston, MA, USA; pp. 619-622; Jun. 8-12, 2003.
Ro et al.; Poly (dimethylsiloxane) microchip for precolumn reaction and micellar electrokinetic chromatography of biogenic amines, Electrophoresis, 23(7-8), pp. 1129-1137, Apr. 2002.
Roman et al.; Fully integrated microfluidic separations systems for biochemical analysis, J. Chromatogr. A, 1168(1-2), pp. 170-188, Oct. 2007.
Roman et al.; Sampling and Electrophoretic Analysis of Segmented Flow Streams in a Microfluidic Device, Anal. Chem., 80(21), pp. 8231-8238 (author manuscript, 19 pgs.), Nov. 2008.
Sabourin et al.; Interconnection blocks: a method for providing reusable, rapid, multiple, aligned and planar microfluidic interconnections; Journal of Micromechanics and Microengineering; 19(3); 10 pages; doi:10.1088/0960-1317/19/3/035021; Feb. 18, 2009.
Sadeghi et al.; On Chip Droplet Characterization: A Practical, High-Sensitivity Measurement of Droplet Impedance in Digital Microfluidics; Anal. Chem.; 84(4); pp. 1915-1923; Feb. 2012.
Sahai et al.; Newborn screening, Critical Reviews in Clinical Laboratory Sciences, 46(2), pp. 55-82, (online) Mar. 2009.
Samsi et al.; A Digital Microfluidic Electrochemical Immunoassay; Lab on a Chip; 14(3); pp. 547-554; Feb. 2014.
Sanghvi & Cook (Ed.); Carbohydrate Modifications in Antisense Research; Chapters 2 and 3, American Chemical Society, Washington DC; (207th National Meeting of the American Chemical Society Mar. 13-17, 1994, San Jose, CA); Dec. 1994.
Sanghvi & Cook (Ed.); Carbohydrate Modifications in Antisense Research; Chapters 6 and 7, American Chemical Society, Washington DC; (207th National Meeting of the American Chemical Society Mar. 13-17, 1994, San Jose, CA); Dec. 1994.
Santen et al.; Superiority of gas chromatography/tandem mass spectrometry assay (GC/MS/MS) for estradiol for monitoring of aromatase inhibitor therapy. Steroids. 72(8), pp. 666-671, Jul. 2007.
Sasano et al.; From Endocrinology to Intracrinology. Endocr Pathol, 9(1), pp. 9-20, Spring 1998.
Satoh et al.; Electrowetting-based valve for the control of the capillary flow, J. Appl. Phys., 103(3), 034903, Feb. 2008.
Satoh et al.; On-chip microfluidic transport and mixing using electrowetting and incorporation of sensing functions, Anal. Chem., 77(21), pp. 6857-6863, Nov. 2005.
Sawai et al., Synthesis and properties of oligoadenylic acids containing 2?-5? phosphoramide linkage, Chem. Lett., 13(5), pp. 805-808, May 1984.
Schertzer et al.; Using capacitance measurements in EWOD devices to identify fluid composition and control droplet mixing; Sens. Actuators B; 145(1); pp. 340-347; Mar. 2010.
SCRIVER_Commentary; A Simple Phenylalanine Method for Detecting Phenylketonuria in Large Populations of Newborn Infants by Guthrie et al., Pediatrics, 32(3), 338-343, Sep. 1963.

(56) References Cited

OTHER PUBLICATIONS

Shah et al., On-demand droplet loading for automated organic chemistry on digital microfluidics, Lab Chip, 13(14), pp. 2785-2795, Jul. 2013.
Shamsi et al; A digital microfluidic electrochemical immunoassay; Lab on a Chip; 14(3); pp. 547-554; (year of pub. sufficiently earlier than effective US filing date and any foreign priority date) 2014.
Shih et al., A feedback control system for high-fidelity digital microfluidics, Lab Chip, 11(3), pp. 535-540, Feb. 2011.
Simpson et al.; Estrogen—the Good, the Bad, and the Unexpected. Endocr Rev, 26(3), pp. 322-330; May 2005.
Sinha et al., A Versatile Automated Platform for Micro-scale Cell Stimulation Experiments, J. Vis. Exp., e50597, 8 pgs., Aug. 2013.
Sinton et al.; Electroosmotic velocity profiles in microchannels, Colloids Surf. A, 222(1-3), pp. 273-283, Jul. 2003.
Skendzel, Rubella immunity: Defining the level of protective antibody, Am. J. Clin. Pathol., 106(2), 170-174, Aug. 1996.
Smith et al; Diagnosis and Management of Female Infertility. Journal of the American Medical Association 290(13), pp. 1767-1770, Oct. 2003.
Sooknanan et al., Nucleic Acid Sequence-Based Amplification, Ch. 12; Molecular Methods for Virus Detection (1st Ed.), Academic Press, Inc., pp. 261-285; Jan. 1995.
Sprinzl et al., Enzymatic incorporation of ATP and CTP analogues into the 3' end of tRNA, Eur. J. Biochem., 81(3), pp. 579-589, Dec. 1977.
Srinivasan et al.; An integrated digital microfluidic lab-on-a-chip for clinical diagnostics on human physiological fluids, Lab Chip, 4(4), pp. 310-315, Aug. 2004.
Stanczyk et al.; Standardization of Steroid Hormone Assays Why, How, and When?, Cancer Epidemiol Biomarkers Prev, 16(9), pp. 1713-1719, Sep. 2007.
Steckl et al.; Flexible Electrowetting and Electrowetting on Flexible Substrates; Proc. SPIE 7956; Advances in Display Technologies; and E-papers and Flexible Displays; 795607 (6 pgs.); Feb. 2011.
Stegink et al.; Plasma amino acid concentrations and amino acid ratios in normal adults and adults heterozygous for phenylketonuria ingesting a hamburger and milk shake meal, American Journal of Clinical Nutrition, 53(3), pp. 670-675, Mar. 1991.
Sun et al.; Rapid and direct microRNA quantification by an enzymatic luminescence assay; (author manuscript; 17 pgs.) Analytical Biochemistry; 429(1); pp. 11-17; Oct. 2012.
Svoboda et al.; Cation exchange membrane integrated into a microfluidic device; Microelectronic Engineering; 86; pp. 1371-1374; Apr.-Jun. 2009.
Szarewski et al.; Contraception. Current state of the art. British Medical Journal, 302(6787), pp. 1224-1226, May 1991.
Szymczak et al.; Concentration of Sex Steroids in Adipose Tissue after Menopause. Steroids, 63(5-6), pp. 319-321, May/Jun. 1998.
Tachibana et al.; Application of an enzyme chip to the microquantification of L-phenylalanine, Analytical Biochemistry, 359(1), pp. 72-78, Dec. 2006.
Tan et al.; A lab-on-a-chip for detection of nerve agent sarin in blood; Lab Chip; 8(6); pp. 885-891; Jun. 2008.
Teh et al.; Droplet microfluidics, Lab Chip, 8(2), pp. 198-220, Feb. 2008.
Therrell et al.; Newborn screening in North America, Journal of Inherited Metabolic Disease, 30(4), pp. 447-465, Aug. 2007.
Tian et al., Printed two-dimensional micro-zone plates for chemical analysis and ELISA, Lab on a Chip, 11(17), pp. 2869-2875, Sep. 2011.
Tobjörk et al., IR-sintering of ink-jet printed metal-nanoparticles on paper, Thin Solid Films, 520(7), pp. 2949-2955, Jan. 2012.
Tomita et al.; Loop-mediated isothermal amplification (LAMP) of gene sequences and simple visual detection of products; Nature Protocols; 3(5); pp. 877-882; (online) Apr. 2008.
Turgeon et al.; Combined Newborn Screening for Succinylacetone, Amino Acids, and Acylcarnitines in Dried Blood Spots, Clinical Chemistry, 54(4), pp. 657-664, Apr. 2008.
Udenfriend et al.; Fluorescamine: a reagent for assay of amino acids, peptides, proteins, and primary amines in the picomole range, Science, 178(4063), pp. 871-872, Nov. 1972.
Unger et al.; Monolithic microfabricated valves and pumps by multilayer soft lithography, Science, 288(5463), pp. 113-116, Apr. 2000.
Univ. of Maryland—Baltimore Washington Medical Center; Plasma amino acids, 6 pgs., retrieved Feb. 10, 2017 from: http://www.mybwmc.org/library/1/003361, Web address available to applicant(s) at least as of Jan. 2010.
Verkman; Drug Discovery in Academia; Am J Physiol Cell Physiol; 286 (3); pp. C465-C474; Feb. 2004.
Walker et al.; A Chemiluminescent DNA Probe Test Based on Strand Displacement Amplification (Chapter 15); Molecular Methods for Virus Detection (1st Ed.), Academic Press, Inc., pp. 329-349; Jan. 1995.
Walker et al.; A passive pumping method for microfluidic devices, Lab Chip, 2 (3), pp. 131-134, Aug. 2002.
Wang et al., Paper-based chemiluminescence ELISA: lab-on-paper based on chitosan modified paper device and, Biosens. Bioelectron., 31(1), pp. 212-218, Jan. 2012.
Wang et al., Simple and covalent fabrication of a paper device and its application in sensitive chemiluminescence immunoassay, Analyst, 137(16), pp. 3821-3827, Aug. 2012.
Wang et al.; Highly sensitive detection of microRNAs based on isothermal exponential amplification-assisted generation of catalytic G-quadruplexDNAzyme; Biosensors and Bioelectronics, 42; pp. 131-135; Apr. 2013.
Washburn et al.; Large-scale analysis of the yeast proteome by multidimensional protein identification technology, Nat. Biotechnol., 19(3), pp. 242-247, Mar. 2001.
Watson et al.; Multilayer hybrid microfluidics: a digital-to-channel interface for sample processing and separations; Anal. Chem.; 82(15); pp. 6680-6686; Aug. 2010.
Wheeler et al.; Electrowetting-Based Microfluidics for Analysis of Peptides and Proteins by Matrix-Assisted Laser Desorption/Ionization Mass Spectrometry; Anal Chem; 76(16); pp. 4833-4838; Aug. 2004.
Wheeler; Chemistry. Putting electrowetting to work; Science; 322(5901); pp. 539-540; Oct. 2008.
Wu et al.; Design, Simulation and Fabrication of Electrowetting-Based Actuators for Integrated Digital Microfluidics; Proceedings of the 1st IEEE International Conference on Nano/Micro Engineered and Molecular Systems; Zhuhai, China; pp. 1097-1100; Jan. 18-21, 2006.
Wu et al.; Electrophoretic separations on microfluidic chips, J. Chromatogr. A, 1184(1-2), pp. 542-559, Mar. 2008.
Yan et al., A microfluidic origami electrochemiluminescence aptamer-device based on a porous Au-paper electrode and a phenyleneethynylene derivative, Chem. Commun. (Camb), 49(14), pp. 1383-1385, Feb. 2013.
Yan et al., Paper-based electrochemiluminescent 3D immunodevice for lab-on-paper, specific, and sensitive point-of-care testing, Chem.—Eur. J., 18(16), pp. 4938-4945, Apr. 2012.
Yi et al.; Spangler et al., Eds; Channel-to-droplet extractions for on-chip sample preparation, in Proceedings of Solid-State Sensor, Actuator and Microsystems Workshop, pp. 128-131, Jun. 2006.
Yin et al.; One-step, multiplexed fluorescence detection of microRNAs based on duplex-specific nuclease signal amplification; J. American Chem. Soc.; 134(11); pp. 5064-5067; Mar. 2012.
Yoon et al.; Preventing Biomolecular Adsorption in Electrowetting-Based Biofluidic Chips; Anal Chem; 75; pp. 5097-5102; Aug. 2003.
Yoon; Open-Surface Digital Microfluidics; The Open Biotechnology Journal; 2(1); pp. 94-100; Apr. 2008.
Young et al.; Calculation of DEP and EWOD Forces for Application in Digital Microfluidics, J. Fluids Eng., 130(8), pp. 081603-1-081603-9, Jul. 2008.
Yu et al.; Microfabrication of a digital microfluidic platform integrated with an on-chip electrochemical cell; Journal of Micromechanics and Microrngineering; 23(9); pp. 10 pages; doi: 10.1088/0960-1317/23/9/095025; Aug. 2013.
Yu et al., Monolithic porous polymer for on-chip solid-phase extraction and preconcentration prepared by photoinitiated in situ

(56) References Cited

OTHER PUBLICATIONS polymerization within a microfluidic device, Analytical Chemistry , 73(21), pp. 5088-5096, Nov. 2001.
Yu et al.; Parallel-plate lab-on-chip electrochemical analysis; Journal of Micromechanics and Microengineering; 24(1); 7 pages; doi: 10.1088/0960-1317/24/1/015020; Dec. 16, 2013.
Yu et al., Preparation of monolithic polymers with controlled porous properties for microfluidic chip applications using photoinitiated free-radical polymerization, Journal of Polymer Science, Part A: Polymer Chemistry, 40(6), pp. 755-769, Mar. 2002.
Yu et al.; A plate reader-compatible microchannel array for cell biology assays; Lab Chip; 7(3); pp. 388-391; Mar. 2007.
Zaffanello et al.; Multiple positive results during a neonatal screening program: a retrospective analysis of incidence, clinical implications and outcomes, Journal of Perinatal Medicine, 33(3), pp. 246-251, May 2005.
Zhang et al.; Multiplexed detection of microRNAs by tuning DNA-scaffolded silver nanoclusters; Analyst; 138(17); pp. 4812-4817; Sep. 2013.
Zhao et al., Lab on Paper, Lab Chip, 8(12), pp. 1988-1991, Dec. 2008.
Znidarsic-Plazl et al.; Steroid extraction in a microchannel system—mathematical modelling and experiments. Lab Chip, 7(7), pp. 883-889, Jul. 2007.
Zuker; Mfold Web Server for Nucleic Acid Folding and Hybridization Prediction; Nucleic Acid Research ; 31(13); pp. 3406-3415; Jul. 2003.
Zytkovicz et al.; Tandem mass spectrometric analysis for amino, organic, and fatty acid disorders in newborn dried blood spots: a two-year summary from the New England Newborn Screening Program, Clinical Chemistry, 47(11), pp. 1945-1955, Nov. 2001.
Fobel et al.; U.S. Appl. No. 15/457,930 entitled "Printed Digital Microfluidic Devices Methods of Use and Manufacture Thereof", filed Mar. 13, 2017.
Soto-Moreno et al.; U.S. Appl. No. 16/259,984 entitled "Digital microfluidics devices and methods of using them," filed Jan. 28, 2019.
Yu et al.; Microfabtrication of a digital microfluidic platform integrated with an on-chip electrochemical cell; Journal of Micromechanics and Microengineering; 23(9); doi:10.1088/0960-1317/23/9/095025, 10 pages; Aug. 28, 2013.
Jebrail et al.; U.S. Appl. No. 16/455,459 entitled "Digital microfluidic devices and methods," filed Jun. 27, 2019.

* cited by examiner

S/W : Software
GUI : Graphic user interface
SP : Switch Processor
MP : Main Processor
HV GND: High voltage ground
Sys GND: System ground
ADC: Analog to digital converter
Y : Yes
N : No

FEEDBACK SYSTEM FOR PARALLEL DROPLET CONTROL IN A DIGITAL MICROFLUIDIC DEVICE

CROSS REFERENCE TO RELATED APPLICATIONS

This patent application claims priority to U.S. Provisional Patent Application No. 62/377,797, filed on Aug. 22, 2016 (titled "FEEDBACK SYSTEM FOR PARALLEL DROPLET CONTROL IN A DIGITAL MICROFLUIDIC DEVICE"), and herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

Digital microfluidics (DMF) has emerged as a powerful liquid-handling technology for a broad range of miniaturized biological and chemical applications (see, e.g., Jebrail, M. J.; Bartsch, M. S.; Patel, K. D., Digital microfluidics: a versatile tool for applications in Chemistry, biology and medicine. Lab Chip 2012, 12 (14), 2452-2463.). DMF enables real-time, precise, and highly flexible control over multiple samples and reagents, including solids, liquids, and harsh chemicals, without need for pumps, valves, moving parts or cumbersome tubing assemblies. Discrete droplets of nanoliter to microliter volumes are dispensed from reservoirs onto a planar surface coated with a hydrophobic insulator, where they are manipulated (transported, split, merged, mixed) by applying a series of electrical potentials to an embedded array of electrodes. See, for example: Pollack, M. G.; Fair, R. B.; Shenderov, A. D., Electrowetting-based actuation of liquid droplets for microfluidic applications. Appl. Phys. Lett. 2000, 77 (11), 1725-1726; Lee, J.; Moon, H.; Fowler, J.; Schoellhammer, T.; Kim, C. J., Electrowetting and electrowetting-on dielectric for microscale liquid handling. Sens. Actuators A Phys. 2002, 95 (2-3), 259-268; and Wheeler, A. R., Chemistry—Putting electrowetting to work. Science 2008, 322 (5901), 539-540.

This technology allows for high flexibility, facile integration and ultimately cost effective automation of complex tasks.

The present invention relates to the detection of a droplet position and size on a digital microfluidic device. Droplet movement on a DMF device is initiated by the application of high voltage to an electrode pad patterned on an insulating substrate; this step is then repeatedly applied to adjacent electrode pads creating a pathway for a droplet across the device. For better control of the droplet movement, and to ensure a complete droplet translation from one pad to another, feedback systems are often employed to detect the exact position of a droplet upon its actuation. If the droplet has not completed the desired translation, the high voltage could be reapplied.

Most of the feedback/measurement circuits developed to control DMF droplets are based on impedance/capacitance measurements. For example, a system shown in FIGS. 1D and 1E detect droplet position and measure droplet velocity based on impedance measurements (e.g., Shih, S. C. C.; Fobel, R.; Kumar, P.; Wheeler, A. R. A, Feedback Control System for High-Fidelity Digital Microfluidics. Lab Chip 2011 (11), 535-540). The measured values are compared to threshold values to evaluate droplet movement. Velocity of the droplet is calculated based on the length of electrode and the duration of the high voltage pulse. Other examples of capacitance/impedance based systems are used to precisely measure droplet size as it is being dispensed from a reservoir. See, e.g., Ren, H.; Fair, R. B.; Pollack, M. G., Automated on-chip droplet dispensing with volume control by electro-wetting actuation and capacitance metering. Sens. Actuators B 2004 (98), 319; and Gong, J.; Kim, C.-J., All-electronic droplet generation on-chip with real-time feedback control for EWOD digital microfluidics. Lab Chip 2008 (8), 898. In another example, capacitance measurement is used to investigate composition of droplets and mixing efficiency (e.g., Schertzer, M. J.; Ben-Mrad, R.; Sullivan, P. E., Using capacitance measurements in EWOD devices to identify fluid composition and control droplet mixing. Sens. Actuators B 2010 (145), 340).

To obtain feedback signal from a droplet using the prior art systems above, a measuring electrical signal is first supplied to an electrode pad, and then through the top substrate fed to a common measurement circuit. The common circuit provides a single value in each feedback measurement, hence property of a single droplet only (e.g., size, position, composition) can be precisely read in one measurement. Monitoring and control of multiple droplets is not feasible simultaneously but rather in a serial mode.

To provide a solution for real-time monitoring of parallel reactions on DMF devices, we have developed a new electrical feedback system design for the simultaneous detection of multiple droplets and their properties. The properties include but are not limited to droplet position, size, composition, etc. See also, Sadeghi, S.; Ding, H.; Shah, G. J.; Chen, S.; Keng, P. Y.; Kim, C. J.; van Dam, R. M., On Chip Droplet Characterization: A Practical, High-Sensitivity Measurement of Droplet Impedance in Digital Microfluidics. Anal. Chem. 2012 (84), 1915, and Murran M. A.; Najjaran, H., Capacitance-based droplet position estimator for digital microfluidic devices. Lab Chip 2012 (12), 2053.

SUMMARY OF THE DISCLOSURE

In general, described herein are digital microfluidics apparatuses (e.g., devices and systems) that are configured to determine provide feedback on the location, rate of movement, rate of evaporation and/or size (or other physical characteristic) of one or more, and preferably more than one, droplet in the gap region of a digital microfluidics (DMF) apparatus. In particular, described herein are methods and apparatuses that may be used to simultaneously or concurrently determine a physical characteristic (size, location, rate of movement, rate of evaporation, etc.). These methods and apparatuses may generally switch between applying voltage to a first plate of the apparatus, e.g., applying voltage to move droplets by applying voltage to the actuation electrodes), stopping the application of voltage (which may allow discharging of a sensing circuit), and applying voltage to one or more ground electrodes (e.g., one or more second-plate ground electrodes).

For example, described herein are digital microfluidic (DMF) apparatuses with parallel droplet detection. Such a DMF apparatus may include: a first plate having a plurality of actuation electrodes; a second plate having one or more ground electrodes, wherein the first plate is spaced opposite from the first plate by a gap; a voltage source; a plurality of sensing circuits, wherein a sensing circuit from the plurality of sensing circuits is electrically connected to each actuation electrode, wherein each sensing circuit is configured to detect a voltage between an actuation electrode to which it is electrically connected and the one or more second-plate ground electrodes; and a controller configured to alternate between applying voltage from the voltage source to the first plate and the second plate, wherein applying voltage to the first plate comprises applying voltage to one or more actuation electrodes from the plurality of actuation electrodes to move one or more droplets within the gap, and wherein applying voltage to the second plate comprises applying voltage to the one or more second-plate ground electrodes, further wherein the controller is configured to sense, in parallel, a property of the one or more droplets (e.g., the location of one or more droplets relative to the plurality of actuation electrodes, a size of the one or more droplets, an evaporation rate of the one or more droplets, a rate of movement of one or more droplets, etc.) based on input from each of the sensing circuits when applying voltage to the second plate.

Each sensing circuit of the plurality of sensing circuits may comprise a charging circuit, a discharging circuit, and an analog-to-digital converter (ADC), further wherein the discharging circuit comprises a transistor and a ground. For example, each sensing circuit of the plurality of sensing circuits may comprise a charging circuit, a discharging circuit, and an analog-to-digital converter (ADC), further wherein the charging circuit comprises a capacitor and a diode. Each sensing circuit of the plurality of sensing circuits may comprise a charging circuit, a discharging circuit, and an analog-to-digital converter (ADC), further wherein the ADC is configured to detect the charged voltage of the charging circuit. For example, each sensing circuit of the plurality of sensing circuits may comprises a charging circuit, a discharging circuit, and an analog-to-digital converter (ADC), further wherein the controller is configured to sequentially activate the discharge circuit, then the charging circuit, and to receive the charged voltage of the charging circuit from the ADC in parallel for all of the sensing circuits of the plurality of sensing circuits.

Any of these apparatuses may include a forward/reverse switch connected between the voltage source, the one or more ground second-plate electrodes, and the plurality of actuation electrodes, wherein the controller is configured to operate the forward/reverse switch to switch between applying voltage to the first plate and the second plate. The apparatus may also include a plurality of electrode switches, wherein each electrode switch from the plurality of electrode switches is connected to an actuation electrode of the plurality of actuation electrodes and is controlled by the switch controller to apply voltage from the voltage source to the actuation electrode.

In general, any appropriate voltage supply may be used. For example, the voltage supply may comprise a high-voltage supply.

The controller may be configured to compare a voltage sensed by each of the plurality of sensing circuits to a threshold voltage value to determine the location of one or more droplets relative to the plurality of actuation electrodes. In some variations, the controller is configured to compare a voltage sensed by each of the plurality of sensing circuits to a predetermined voltage value or range of voltage values to determine the size of one or more droplets.

An example of a digital microfluidic (DMF) apparatus with parallel droplet detection may include: a first plate having a first hydrophobic layer; a second plate having a second hydrophobic layer; a plurality of actuation electrodes in the first plate; one or more ground electrodes in the second plate; a voltage source; a forward/reverse switch connected between the ground, voltage source, the one or more second-plate ground electrodes, and the plurality of actuation electrodes, wherein the forward/reverse switch is configured to switch a connection between the voltage source and either the one or more second-plate ground electrodes or the plurality of actuation electrodes; a plurality of electrode switches, wherein an electrode switch from the plurality of electrode switches is connected between the forward/reverse switch and each actuation electrode of the plurality of actuation electrodes and is controlled by the switch controller and configured to allow an application of voltage from the voltage source to the electrode; a plurality of sensing circuits, wherein a sensing circuit from the plurality of sensing circuits is connected between each electrode and the electrode switch connected between the forward/reverse switch and each actuation electrode; a controller configured to control the forward/reverse switch and a switch controller configured to control the plurality of electrode switches to move one or more droplets within a gap between the first plate and the second plate when the forward/reverse switch connects the voltage source to the plurality of electrodes, and further configured to determine the location of one or more droplets relative to the plurality of actuation electrodes when the forward/reverse switch connects the voltage source to the one or more ground electrodes based on input from each of the sensing circuits.

Also described herein are methods of simultaneously determining the locations of multiple drops in a digital microtluidics (DMF) apparatus, the method comprising: applying voltage to a plurality of actuation electrodes in a first plate to move one or more droplets within a gap between the first plate and a second plate; applying voltage to one or more ground electrodes in the second plate; concurrently sensing, in a plurality of sensing circuits, wherein each actuation electrode is associated with a separate sensing circuit from the plurality of sensing circuits, a charging voltage while applying voltage to the one or more ground electrodes; and determining a property of the one or more droplets (e.g., a location of the one or more droplets relative to the plurality of actuation electrodes, a size of the one or more droplets, an evaporation rate of the one or more droplets, a rate of movement of the one or more droplets, etc.) based on the sensed charging voltages.

Applying voltage to the plurality of actuation electrodes and applying voltage to the one or more ground electrodes may comprise applying applying voltage from the same high voltage source. Applying voltage to the plurality of actuation electrodes may comprise sequentially applying voltage to adjacent actuation electrodes.

Any of these methods may include re-applying voltage to one or more of the plurality of actuation electrodes based on the determined location of the one or more droplets. In general, the sensing circuit output (e.g., the charging voltage) and/or any information derived from the sensing circuit output, such as droplet size, location, rate of movement, rate of evaporation, etc., may be provided as feedback to the apparatus, e.g., to correct the motion by adjusting the applied actuation voltages, etc.

Applying voltage to one or more ground electrodes in the second plate may comprise applying voltage to the one or more ground electrodes without applying voltage to the actuation electrodes in the first plate.

Any of these methods may include discharging voltage in each of the sensing circuits in the first plate prior to applying voltage to the one or more ground electrodes. Any of these methods may include charging a capacitor in each of the sensing circuits of a plurality of sensing circuits in the first plate when applying voltage to the one or more ground electrodes. For example, the method may include discharging voltage in each of the sensing circuits prior to applying voltage to the one or more ground electrodes and then charging a capacitor in each of the sensing circuits in the plurality of sensing circuits when applying voltage to the one or more ground electrodes.

The determining a location of the one or more droplets may comprise comparing the sensed charging voltages to a predetermined value or range of values to determine if a droplet is on or adjacent to an actuation electrode. Determining a location of the one or more droplets may comprise comparing the sensed charging voltages to a predetermined threshold voltage value to determine if a droplet is on or adjacent to an actuation electrode.

Any of these methods may also include determining the size of the one or more droplets based on the sensed charging voltages. Alternatively or additionally, any of these methods may include correcting droplet motion based on the determined location of the one or more droplets (e.g., using the feedback to adjust the droplet motion). Alternatively or additionally, any of these methods may include determining an evaporation rate based on the sensed charging voltages.

An example of a method of simultaneously determining the locations of multiple drops in a digital microfluidics (DMF) apparatus may include: applying voltage to a plurality of actuation electrodes in a first plate to move one or more droplets within a gap between the first plate and a second plate; discharging voltage in each sensing circuit of a plurality of sensing circuits when not applying voltage to the plurality of actuation electrodes in the first plate, wherein each actuation electrode is associated with a separate sensing circuit from the plurality of sensing circuits; applying voltage to one or more ground electrodes in the second plate after discharging the voltage; concurrently sensing, in each of the sensing circuits, a charging voltage while applying voltage to the one or more ground electrodes; and determining a size or location of the one or more droplets relative to the plurality of actuation electrodes based on the sensed charging voltages.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1D shows an overview schematic of a droplet control system, showing the relationships between the PC, the function generator and amplifier, the relay box, the DMF device, and the measurement circuit. FIG. 1E illustrates a detailed schematic and circuit model of a DMG device and the measurement/feedback circuit, adapted from Shih, S. C. C.; Fobel, R.; Kumar, P.; Wheeler, A. R. A, *Feedback Control System for High-Fidelity Digital Microfluidics*. Lab Chip 2011 (11), 535-540.

DETAILED DESCRIPTION

Figures 1A, 1B, 1C:
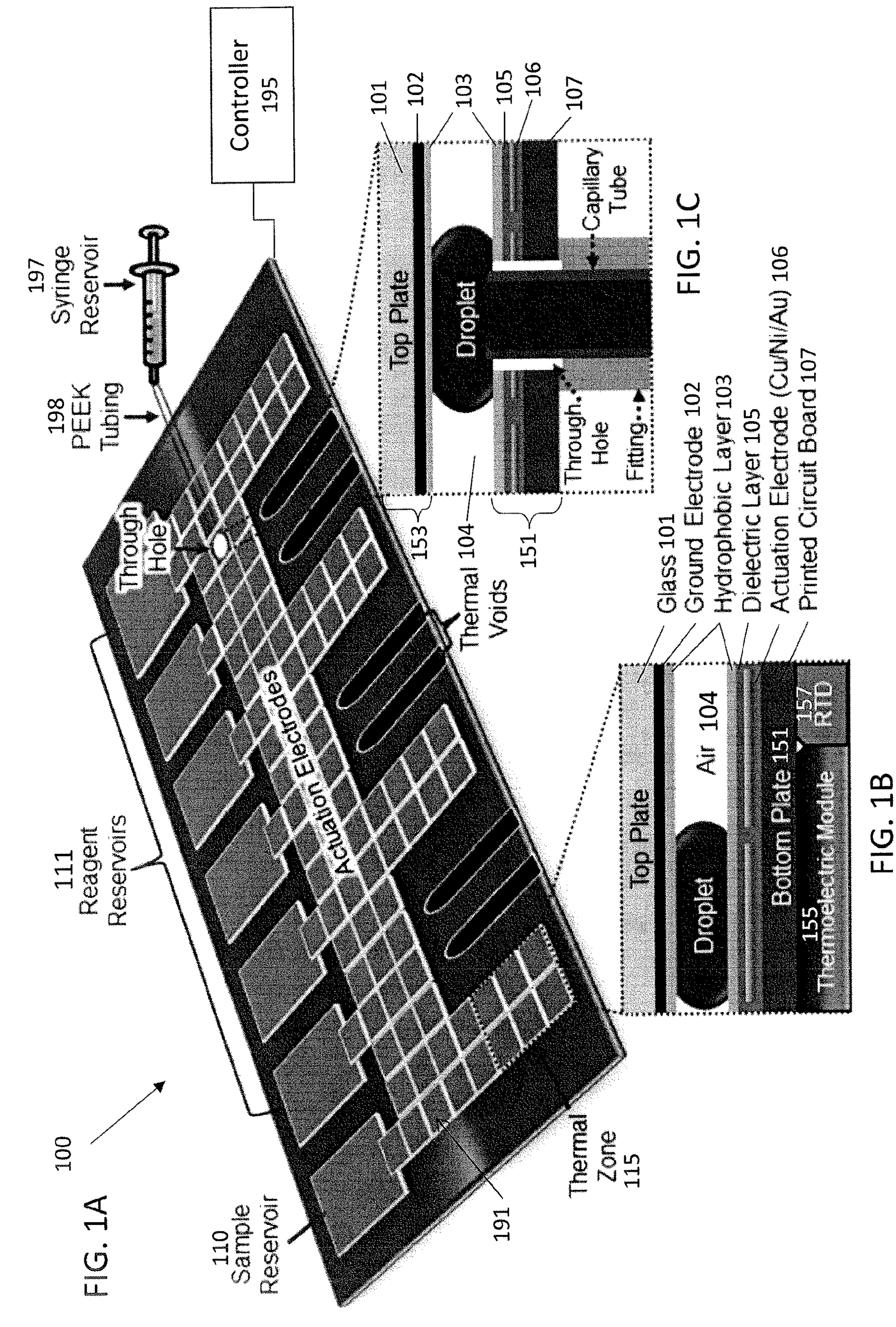
FIG. 1A is a schematic of one example of a digital microfluidic (DMF) apparatus, from a top perspective view.
FIG. 1B shows an enlarged view through a section through a portion of the DMF apparatus shown in FIG. 1A, taken through a thermally regulated region (thermal zone).
FIG. 1C shows an enlarged view through a second section of a region of the (in this example, air-matrix) DMF apparatus of FIG. 1A; this region includes an aperture through the bottom plate and an actuation electrode, and is configured so that a replenishing droplet may be delivered into the air gap of the air-matrix DMF apparatus from the aperture (which connects to the reservoir of solvent, in this example shown as an attached syringe).
Figure 1D:
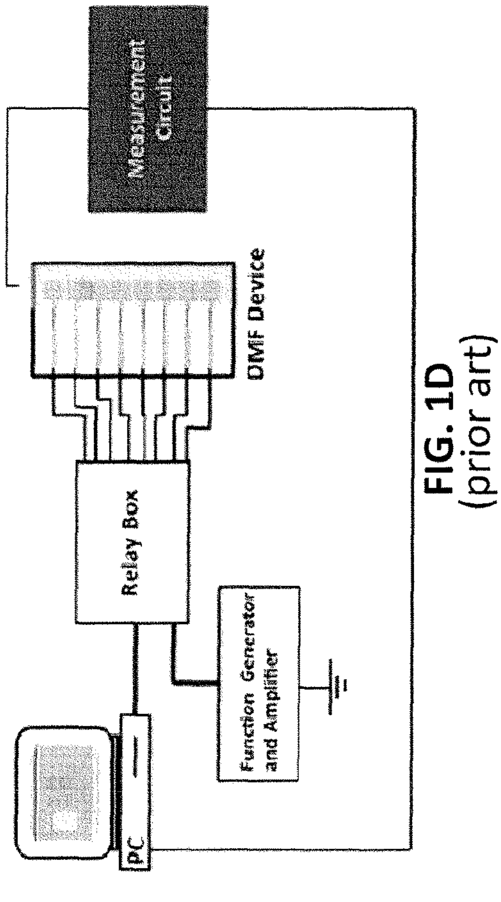
FIG. 1D (prior art)
FIGS. 1D and 1E illustrate schematics of a prior art droplet control system.
Figure 1E:
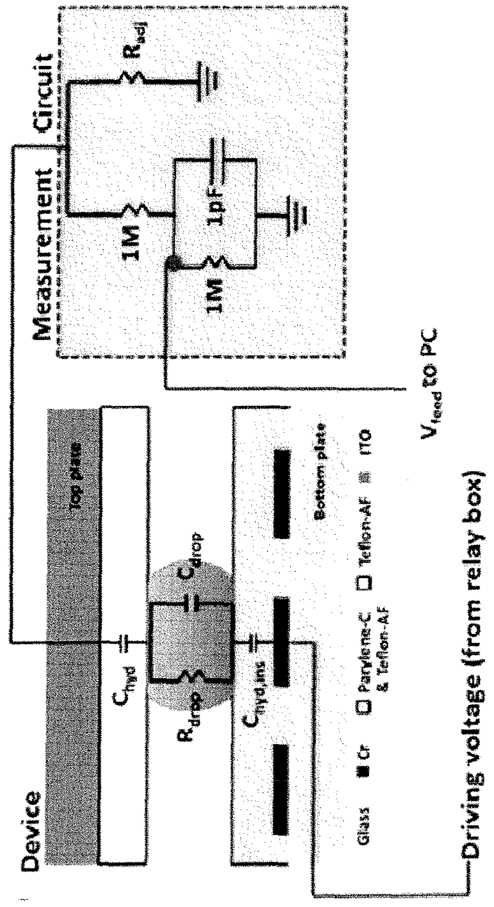
FIG. 1E (prior art)

Described herein are Digital Mircrofluidics (DMF) apparatuses (e.g., devices and systems) that may be used for multiplexed processing and routing of samples and reagents to and from channel-based microfluidic modules that are specialized to carry out all other needed functions. These DMF apparatuses may be air-matrix (e.g., open air), enclosed and/or oil-matrix DMF apparatuses and methods of using them. In particular, described herein are DMF apparatuses and methods of using them for concurrent, e.g., simultaneous, parallel, etc., determining of droplet properties (such as location relative to the apparatus, rate of movement of the droplet, rate of evaporation of the droplet, size of the droplet, etc.). This is possible because the apparatus may include a plurality of individual sensing circuits, each connected to a particular actuating electrode, and a controller that switches between applying voltage to the actuating electrodes, and subsequently applying voltage to the ground electrode(s) opposite from the plurality of actuating electrodes (and sensing circuits). The controller may also receive the sensing circuit data and compare the results (e.g., charging voltage data) to predetermined values or ranges of values to infer the location, size, rate of movement, etc. of droplets. Because of the arrangement of elements described herein, which may be incorporated into any of a variety of DMF apparatuses, the resulting data may be used for feedback, including real-time feedback, for controlling and monitoring the operation of a DMF apparatus.

For example, a DMF may integrate channel-based microfluidic modules. The apparatuses (including systems and devices) described herein may include any of the features or elements of previously described DMF apparatuses, such as actuating electrodes, thermal regulators, wells, reaction regions, lower (base or first) plates, upper (second) plates, ground(s), etc.

As used herein, the term, "thermal regulator" (or in some instances, thermoelectric module or TE regulator) may refer to thermoelectric coolers or Peltier coolers and are semiconductor based electronic component that functions as a small heat pump. By applying a low voltage DC power to a TE regulator, heat will be moved through the structure from one side to the other. One face of the thermal regulator may thereby be cooled while the opposite face is simultaneously heated. A thermal regulator may be used for both heating and cooling, making it highly suitable for precise temperature control applications. Other thermal regulators that may be used include resistive heating and/or recirculating heating/cooling (in which water, air or other fluid thermal medium is recirculated through a channel having a thermal exchange region in thermal communication with all or a region of the air gap, e.g., through a plate forming the air gap).

As used herein, the term "temperature sensor" may include resistive temperature detectors (RTD) and includes any sensor that may be used to measure temperature. An RTD may measure temperature by correlating the resistance of the RTD element with temperature. Most RTD elements consist of a length of fine coiled wire wrapped around a ceramic or glass core. The RTD element may be made from a pure material, typically platinum, nickel or copper or an alloy for which the thermal properties have been characterized. The material has a predictable change in resistance as the temperature changes and it is this predictable change that is used to determine temperature.

As used herein, the term "digital microfluidics" may refer to a "lab on a chip" system based on micromanipulation of discrete droplets. Digital microfluidic processing is performed on discrete packets of fluids (reagents, reaction components) which may be transported, stored, mixed, reacted, heated, and/or analyzed on the apparatus. Digital microfluidics may employ a higher degree of automation and typically uses less physical components such as pumps, tubing, valves, etc.

As used herein, the term "cycle threshold" may refer to the number of cycles in a polymerase chain reaction (PCR) assay required for a fluorescence signal to cross over a threshold level (i.e. exceeds background signal) such that it may be detected.

The DMF apparatuses described herein may be constructed from layers of material, which may include printed circuit boards (PCBs), plastics, glass, etc. Multilayer PCBs may be advantageous over conventional single-layer devices (e.g., chrome or ITO on glass) in that electrical connections can occupy a separate layer from the actuation electrodes, affording more real estate for droplet actuation and simplifying on-chip integration of electronic components.

A DMF apparatus may be any dimension or shape that is suitable for the particular reaction steps of interest. Furthermore, the layout and the particular components of the DMF device may also vary depending on the reaction of interest. While the DMF apparatuses described herein may primarily describe sample and reagent reservoirs situated on one plane (that may be the same as the plane of the air gap in which the droplets move), it is conceivable that the sample and/or reagent reservoirs may be on different layers relative to each other and/or the air gap, and that they may be in fluid communication with one another.

FIG. 1A shows an example of the layout of a typical DMF apparatus 100. In general, this air-matrix DMF apparatus includes a plurality of unit cells 191 that are adjacent to each other and defined by having a single actuation electrode 106 opposite from a second-plate ground electrode 102; each unit cell may any appropriate shape, but may generally have the same approximate surface area. In FIG. 1A, the unit cells are rectangular. The droplets (e.g., reaction droplets) fit within the air gap between the first 153 and second 151 plates (shown in FIGS. 1A-1C as top and bottom plates). The overall air-matrix DMF apparatus may have any appropriate shape, and thickness. FIG. 1B is an enlarged view of a section through a thermal zone of the air-matrix DMF shown in FIG. 1A, showing layers of the DMF device (e.g., layers forming the bottom plate). In general, the DMF device (e.g., bottom plate) includes several layers, which may include layers formed on printed circuit board (PCB) material; these layers may include protective covering layers, insulating layers, and/or support layers (e.g., glass layer, ground electrode layer, hydrophobic layer; hydrophobic layer, dielectric layer, actuation electrode layer, PCB, thermal control layer, etc.). The air-matrix DMF apparatuses described herein also include both sample and reagent reservoirs, as well as a mechanism for replenishing reagents.

In the example shown in FIGS. 1A-1C, a top plate 101, in this case a glass or other top plate material provides support and protects the layers beneath from outside particulates as well as providing some amount of insulation for the reaction occurring within the DMF device. The top plate may therefore confine/sandwich a droplet between the plates, which may strengthen the electrical field when compared to an open air-matrix DMF apparatus (without a plate). The upper plate (the second plate in this example) may include the ground electrode and may be transparent or translucent; for example, the substrate of the first plate may be formed of glass and/or clear plastic. Adjacent to and beneath the substrate (e.g., glass) is a ground electrode for the DMF circuitry (ground electrode layer 102). In some instances, the ground electrode is a continuous coating; alternatively multiple, e.g., adjacent, ground electrodes may be used. Beneath the grounding electrode layer is a hydrophobic layer 103. The hydrophobic layer 103 acts to reduce the wetting of the surfaces and aids with maintaining the reaction droplet in one cohesive unit.

The first plate, shown as a lower or bottom plate 151 in FIGS. 1A-1C, may include the actuation electrodes defining the unit cells. In this example, as with the first plate, the outermost layer facing the air gap 104 between the plates also includes a hydrophobic layer 103. The material forming the hydrophobic layer may be the same on both plates, or it may be a different hydrophobic material. The air gap 104 provides the space in which the reaction droplet is initially contained within a sample reservoir and moved for running the reaction step or steps as well as for maintaining various reagents for the various reaction steps. Adjacent to the hydrophobic layer 103 on the second plate is a dielectric layer 105 that may increase the capacitance between droplets and electrodes. Adjacent to and beneath the dielectric layer 105 is a PCB layer containing actuation electrodes (actuation electrodes layer 106). As mentioned, the actuation electrodes may form each unit cell. The actuation electrodes may be energized to move the droplets within the DMF device to different regions so that various reaction steps may be carried out under different conditions (e.g., temperature, combining with different reagents, etc.). A support substrate 107 (e.g., PCB) may be adjacent to and beneath (in FIGS. 1B and 1C) the actuation electrode layer 106 to provide support and electrical connection for these components, including the actuation electrodes, traces connecting them (which may be insulated), and/or additional control elements, including the thermal regulator 155 (shown as a TEC), temperature sensors, optical sensor(s), etc. One or more controllers 195 for controlling operation of the actuation electrodes and/or controlling the application of replenishing droplets to reaction droplets may be connected but separate from the first 153 and second plates 151, or it may be formed on and/or supported by the second plate. In FIGS. 1A-1C the first plate is shown as a top plate and the second plate is a bottom plate; this orientation may be reversed. A source or reservoir 197 of solvent (replenishing fluid) is also shown connected to an aperture in the second plate by tubing 198.

As mentioned, the air gap 104 provides the space where the reaction steps may occur, providing areas where reagents may be held and may be treated, e.g., by mixing, heating/cooling, combining with reagents (enzymes, labels, etc.). In FIG. 1A the air gap 104 includes a sample reservoir 110 and a series of reagent reservoirs 111. The sample reservoir may further include a sample loading feature for introducing the initial reaction droplet into the DMF device. Sample loading may be loaded from above, from below, or from the side and may be unique based on the needs of the reaction being performed. The sample DMF device shown in FIG. 1A includes six sample reagent reservoirs where each includes an opening or port for introducing each reagent into the respective reservoirs. The number of reagent reservoirs may be variable depending on the reaction being performed. The sample reservoir 110 and the reagent reservoirs 111 are in fluid communication through a reaction zone 112. The reaction zone 112 is in electrical communication with actuation electrode layer 106 where the actuation electrode layer 106 site beneath the reaction zone 112.

The actuation electrodes 106 are depicted in FIG. 1A as a grid or unit cells. In other examples, the actuation electrodes may be in an entirely different pattern or arrangement based on the needs of the reaction. The actuation electrodes are configured to move droplets from one region to another region or regions of the DMF device. The motion and to some degree the shape of the droplets may be controlled by switching the voltage of the actuation electrodes. One or more droplets may be moved along the path of actuation electrodes by sequentially energizing and de-energizing the electrodes in a controlled manner. In the example of the DMF apparatus shown, a hundred actuation electrodes (forming approximately a hundred unit cells) are connected with the seven reservoirs (one sample and six reagent reservoirs). Actuation electrodes may be fabricated from any appropriate conductive material, such as copper, nickel, gold, or a combination thereof.

All or some of the unit cells formed by the actuation electrodes may be in thermal communication with at least one thermal regulator (e.g., TEC 155) and at least one temperature detector/sensor (RTD 157). In addition, each of the actuation electrodes shown may also include a sensing circuit for providing feedback and on droplet properties (including location, size, etc.) at times during the operation of the apparatus.

Figure 2A:
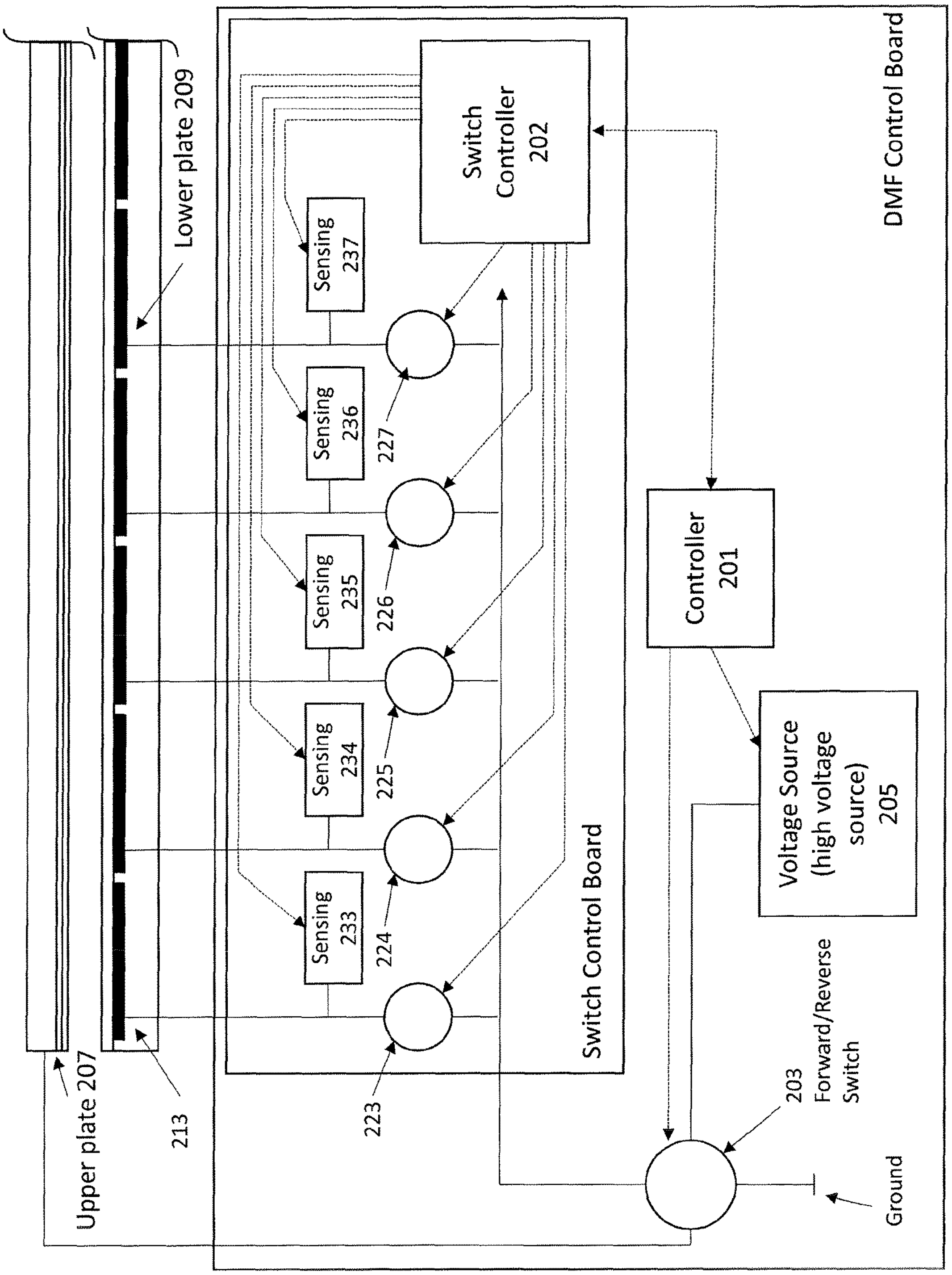
FIG. 2A is an example of a DMF apparatus as described herein, configured to determine (in parallel) the location of one or more droplets in the gap between the plates, e.g., relative to the actuation electrodes.
Figure 2B:
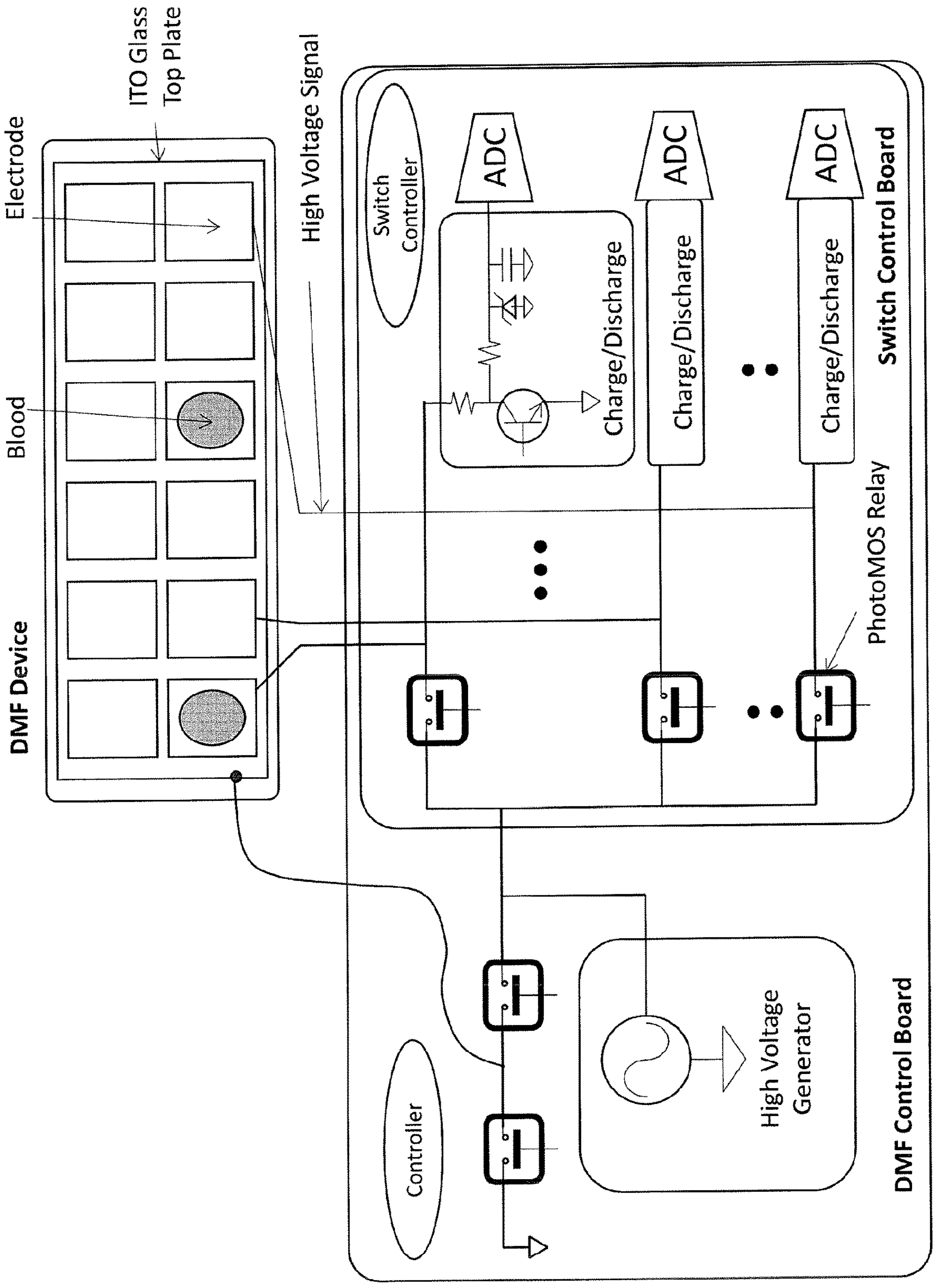
FIG. 2B is another schematic illustration of a DMF apparatus with parallel droplet detection as described herein, illustrating in particular a control system for manipulation of droplets on the DMF apparatus.

For example, FIGS. 2A and 2B illustrate examples of an apparatus providing simultaneous analysis of droplet properties. In this example, a new feedback system has been developed to monitor the position and the size of droplets on a digital microfluidic device.

For example, FIG. 2A illustrates an apparatus configured as a digital microfluidic (DMF) apparatus with parallel droplet detection. The apparatus in this example includes a first plate (lower plate 209) having a first hydrophobic layer and a second plate 207 having a second hydrophobic layer. The generic example show in FIG. 2A also includes a plurality of actuation electrodes 213 in the first plate (any number of actuation electrodes may be included). As mentioned, these electrodes may be formed in or under the first plate, e.g., may be part of this first plate, which may include different layers and/or regions. The example system shown in FIG. 2A also includes one or more ground electrodes in the second plate. For example, a single second-plate ground electrode may be opposite and across the gap, e.g., air gap) from the actuation electrodes. In FIG. 2A the controller 201 is connected to (and controls) a voltage source 205 and may be connected to (and control) forward/reverse switch 203 that is connected to a ground, the voltage source 205, the one or more second-plate ground electrodes, and the plurality of actuation electrodes. The forward/reverse switch 203 may be configured to switch a connection between the voltage source and either the one or more second-plate ground electrodes or the plurality of actuation electrodes. The controller 201 may also be connected to (and control) a switch controller 202, which may regulate one or more switches, including (but not limited to): a plurality of electrode switches (223, 224, 225, 226, 227, etc.), and in some variations, a transistor in each of the sensing units 233, 234, 235, 236, 237, etc. The apparatus shown in FIG. 2A also includes a plurality of sensing circuits (233, 234, 235, 236, 237, etc.), and a sensing circuit from this plurality of sensing circuits may be connected between each electrode and the electrode switch. The plurality of electrode switches (223, 224, 225, 226, 227, etc.) may be connected to the switch controller 202 (controlling their open/close state) and to the voltage source through the forward/reverse switch. Thus, each actuation electrode may be configured to allow an application of voltage from the voltage source.

As mentioned, the controller 201 and the switch controller 202 in FIG. 2A may be configured to control the forward/reverse switch and the plurality of electrode switches to move one or more droplets within a gap between the first plate and the second plate when the forward/reverse switch connects the voltage source to the plurality of electrodes, and further configured to determine the location (or other property) of one or more droplets relative to the plurality of actuation electrodes based on input from each of the sensing circuits when the forward/reverse switch connects the voltage source to the one or more second-plate ground electrodes.

Droplet motion is generated and controlled by a DMF control system, shown in FIG. 2B, which may comprise: high voltage generator to generate high voltage (HV) actuation signals; switch controller that controls photoMOS relay switches and directs actuation signals to individual electrodes; DMF device.

The DMF controller is the main processor that controls DMF devices and sub-controllers like switch controller and high-voltage generator. In a standard operation mode, a user creates commands in the main controller software to be released to the sub-controllers. Examples of such commands are ON/OFF commands to photoMOS relays, high voltage control commands to the high voltage generator, e.g. signal frequency, waveform (square or sinusoidal), etc. Upon execution, the processor reports the results back to the user including set voltage, frequency, droplet position, electrode pads state, etc. Software for the controller is provided on a host computer, a computer integrated with the controller, or wirelessly.

Figure 3:
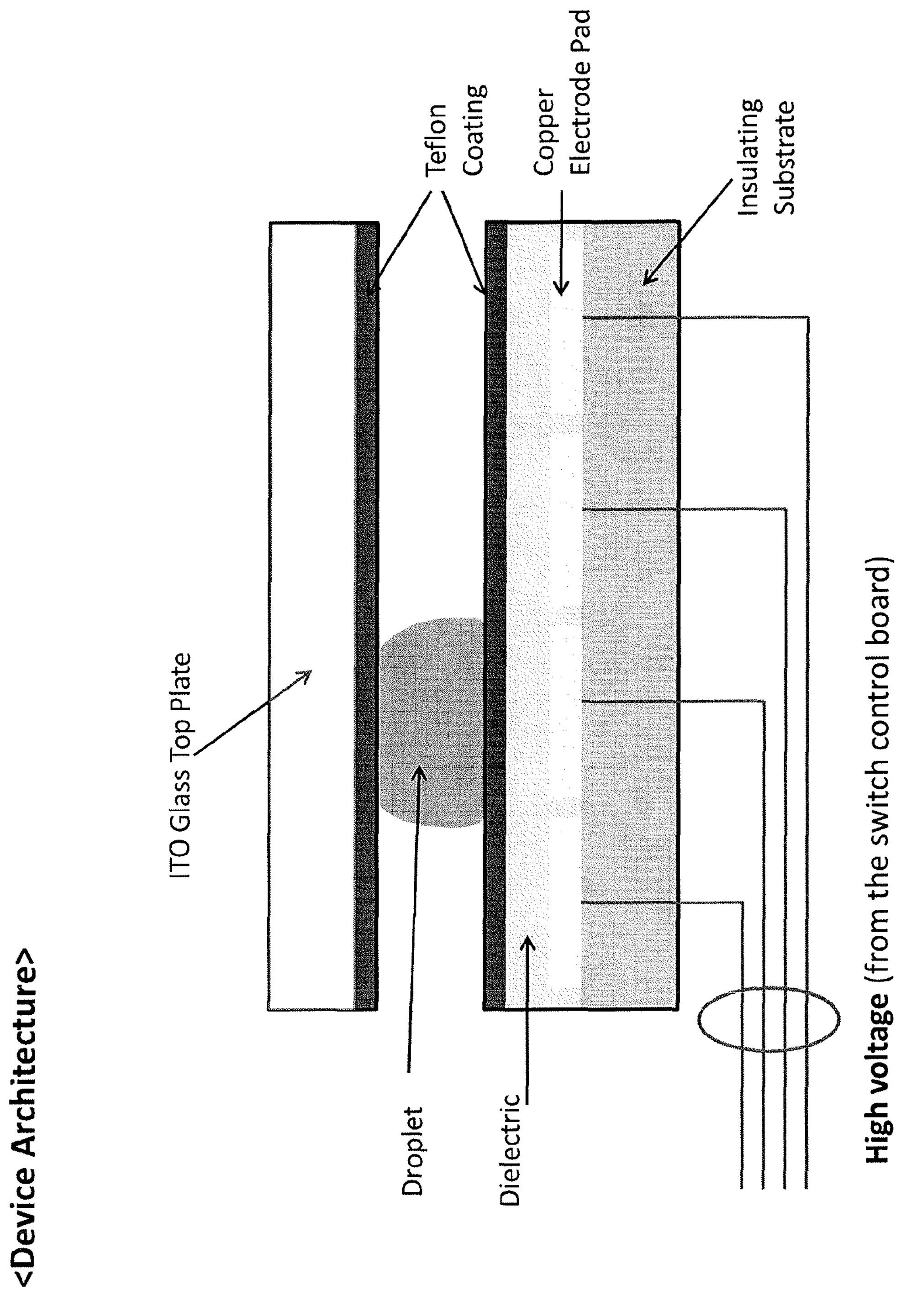
FIG. 3 shows a schematic illustration of another variation of a digital microfluidic device design including concurrent (e.g., parallel) determination of the locations of multiple droplets in a DMF apparatus.

A DMF device is comprised of two insulating substrates (FIG. 3)—bottom substrate with patterned electrode pads (typically Printed Circuit Board (PCB) with copper electrode pads) and a top substrate with at least one electrically conductive pad (typically floated glass coated with Indium Tin Oxide (ITO)). In a standard design, the conductive pad on the top substrate serves as a ground electrode while the high voltage is provided to the bottom electrodes. The bottom substrate and electrode pads are coated with a dielectric layer on top of which a hydrophobic layer like Teflon is deposited. Similarly, the top substrate is coated with a hydrophobic layer. A droplet is sandwiched between the two substrates that are a few hundred micrometers apart.

Figure 4:
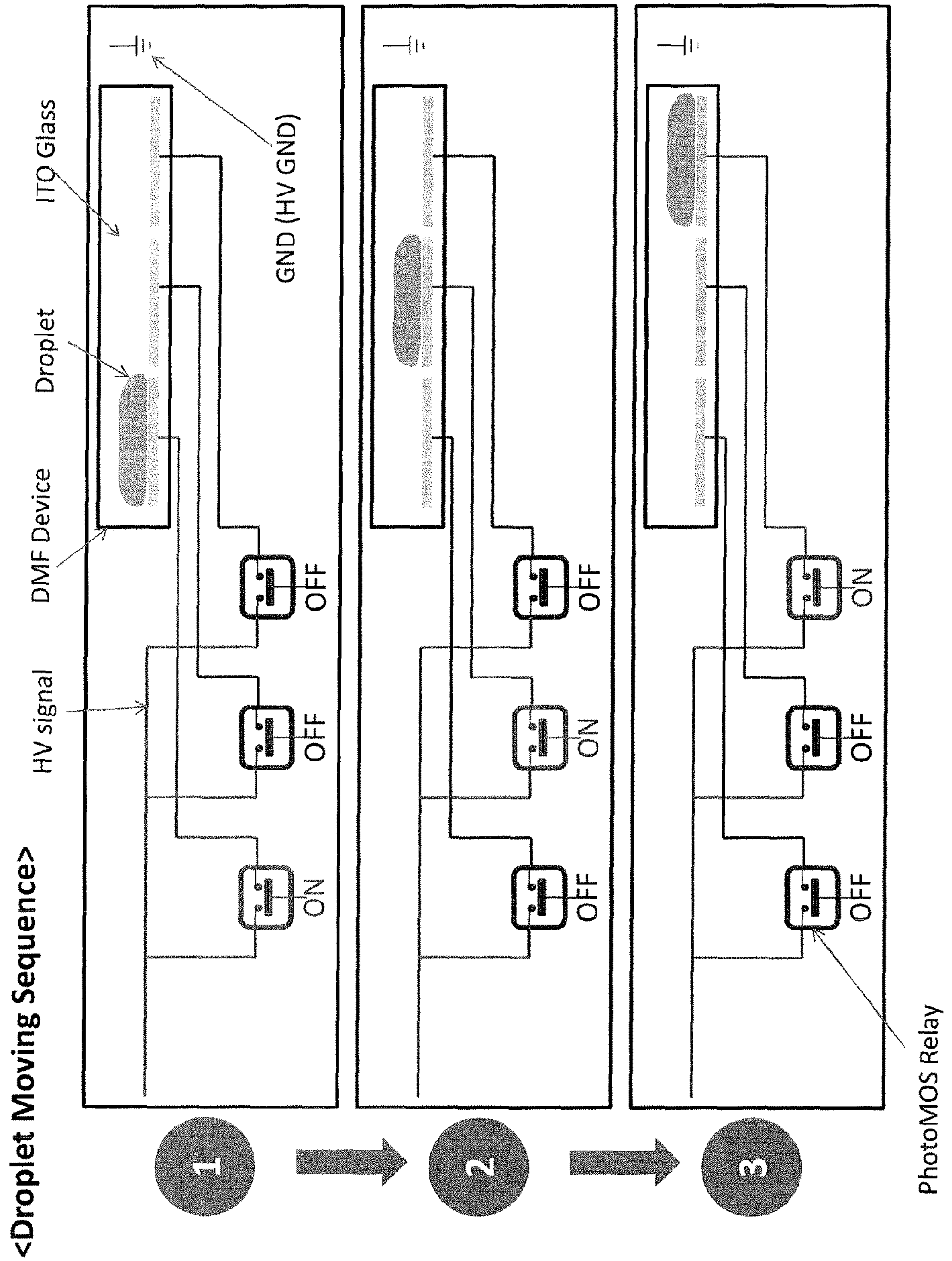
FIG. 4 illustrates droplet actuation using a digital microfluidic device with corresponding photoMOS relay operations.

To manipulate droplets on the grid of electrodes, the switch controller controls photoMOS relays assigning a high voltage signal to an electrode pad in the vicinity of a droplet. Due to electrostatic forces, the droplet moves to the energized electrode. FIG. 4 shows the photoMOS relay operations, for the movement of a droplet across three electrodes. In the first step (1, a droplet is positioned on an energized electrode. In the second step (2), a user selects a neighboring electrode to which a HV will be assigned with the corresponding photoMOS ON position while the first pad/photoMOS will be OFF. This will result in the droplet movement from the first pad to the second pad. Applying similar steps, selecting the third pad ON and the second pad OFF, the droplet will move from the second pad to the third one.

Figure 5:
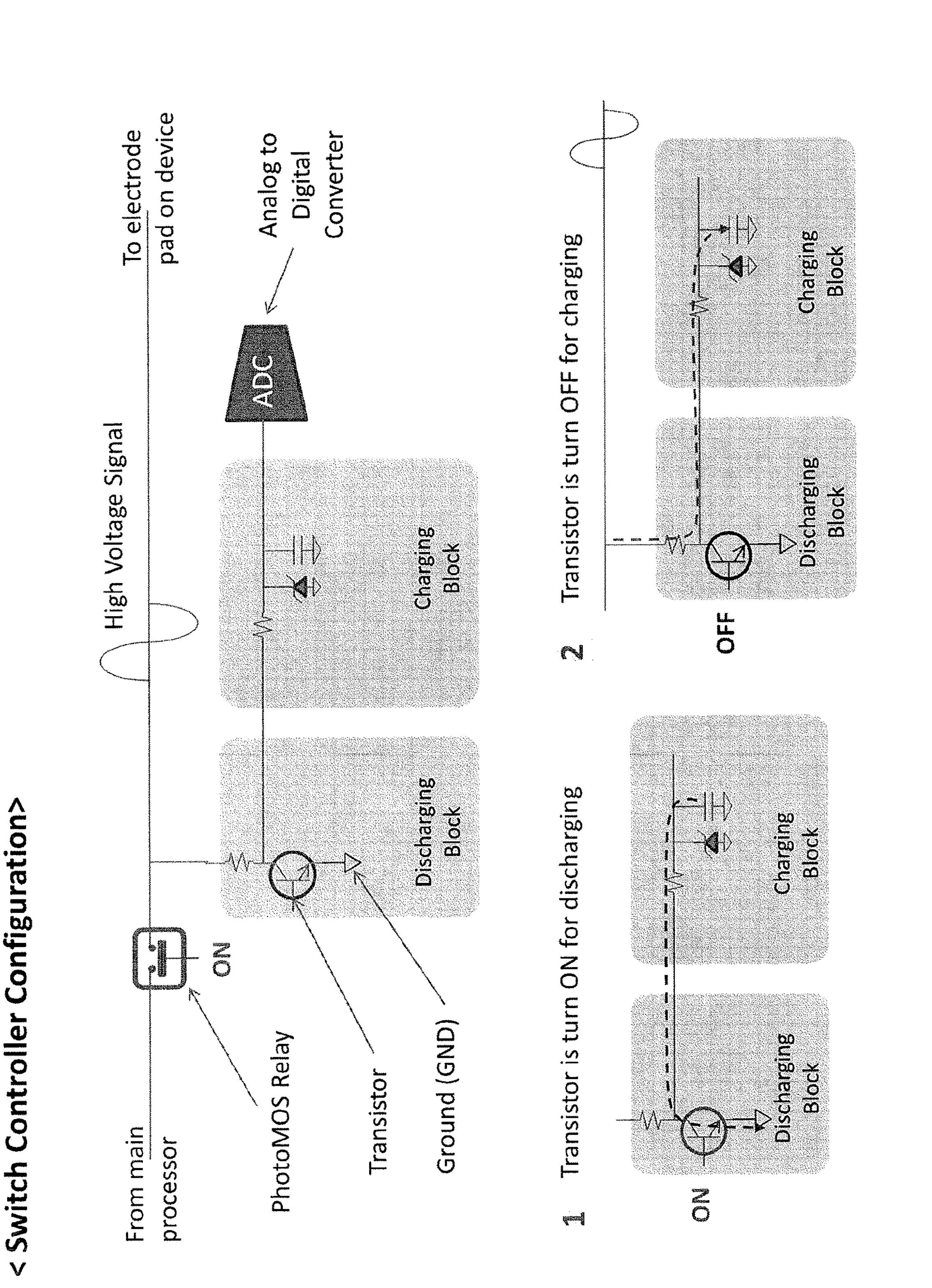
FIG. 5 illustrates one example of a switch controller configuration; in this example, the switches include photoMOS switches, and the sensing circuit includes a discharging and a charging block. In this example the sensing circuit may also include an analog-to-digital converter (ADC).
Figure 6:
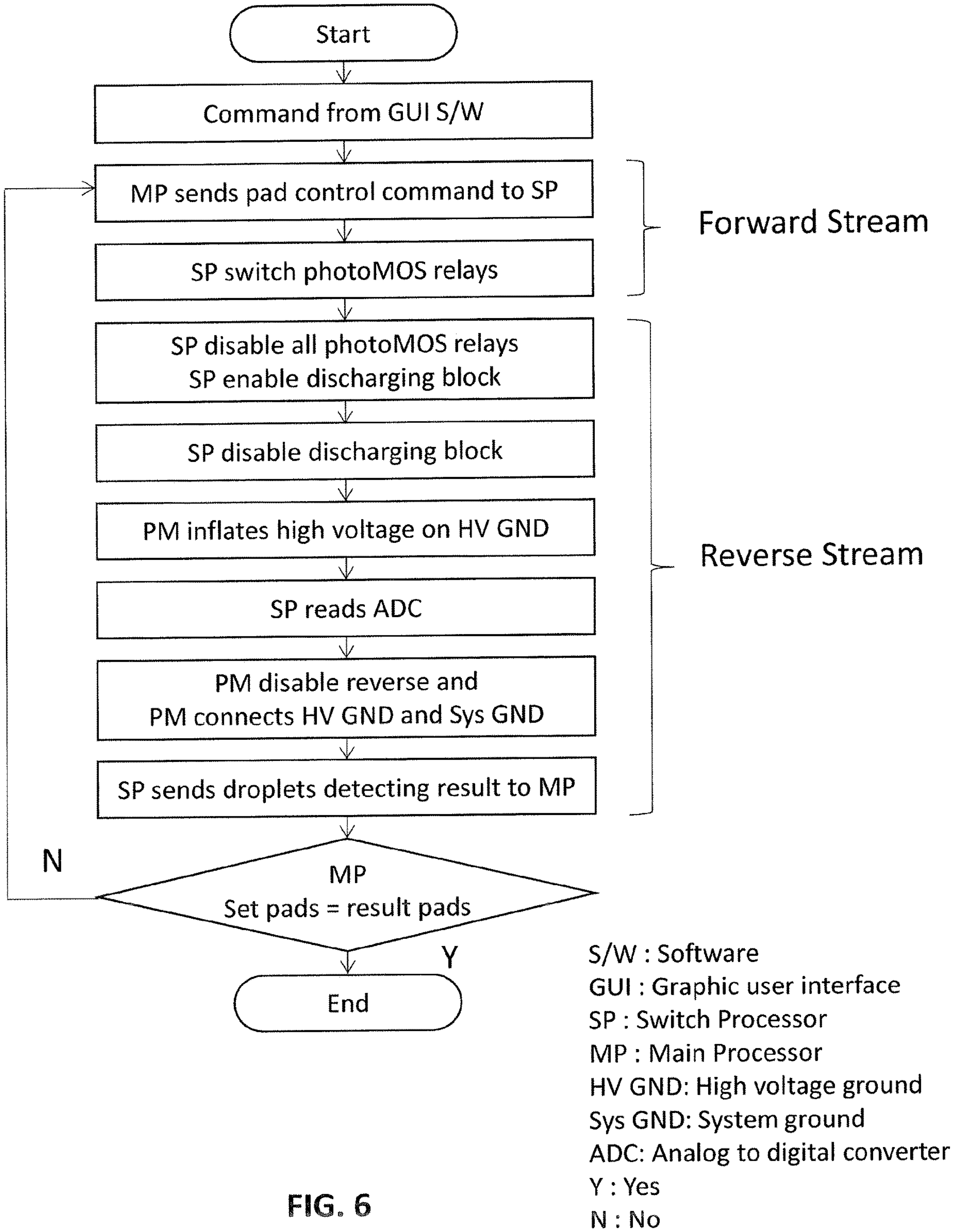
FIG. 6 is one example of a method for forward streaming (which may be embodied, for example, as an algorithm) for droplet motion control and reverse stream algorithm for droplet feedback (e.g., sensing).

The present invention, Reverse Stream feedback system, is enabled by adding charging and discharging blocks and the analog to digital converter (ADC) to the circuits between each photoMOS relay and the corresponding electric pad. Discharging block consist of a transistor and a ground, and the charging block comprises a capacitor and diode, as FIG. 5 shows. The transistor is turned ON for discharging and OFF for charging the capacitor. With this configuration our system can work either in Forward Stream mode for moving the droplets or in Reverse Stream mode for detecting droplet position and size. An algorithm encompassing both modes is presented in FIG. 6.

Figure 8:
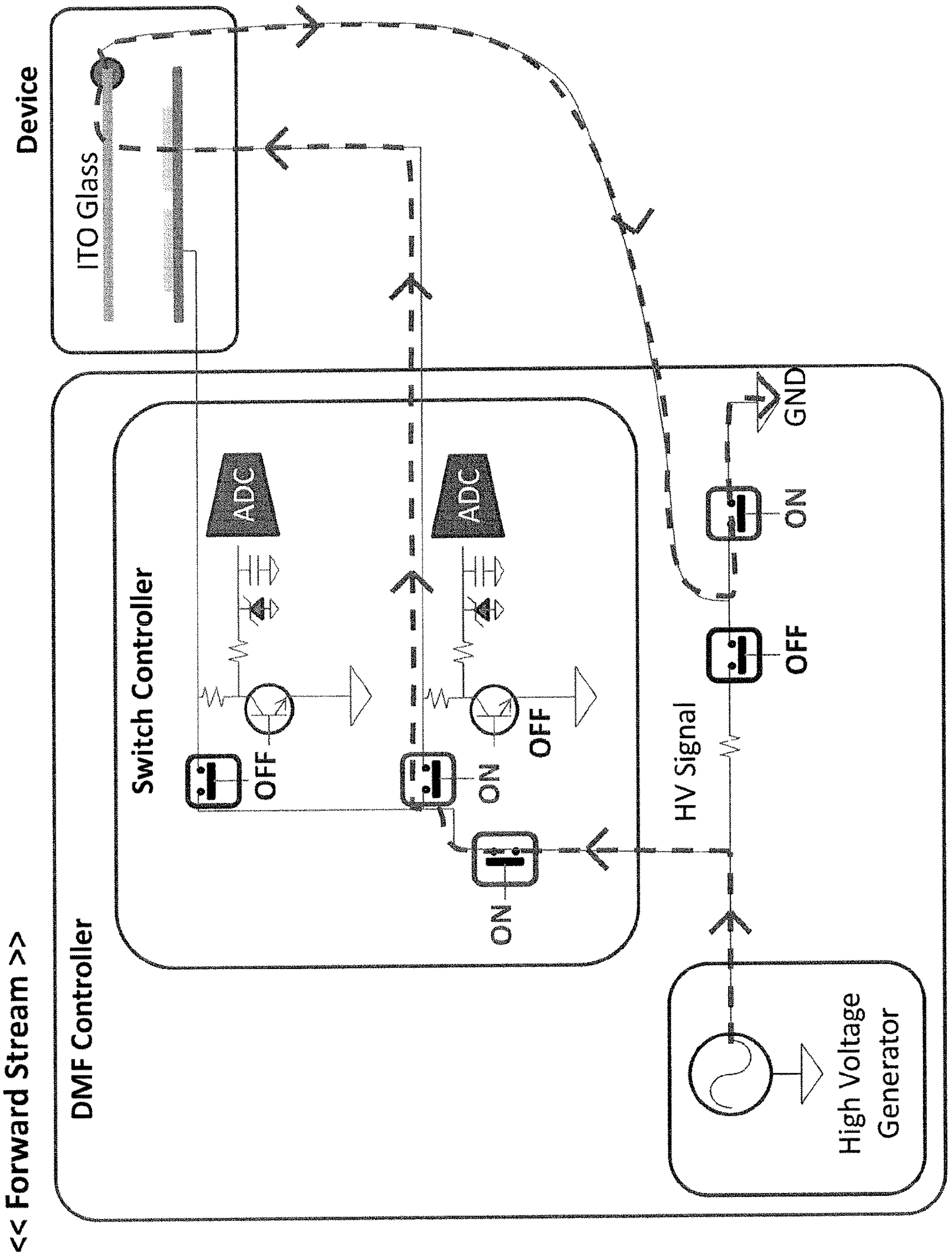
FIG. 8 shows a schematic of an electrical circuit for the 'Forward Stream' mode for actuating a droplet by an electrode.

In Forward Stream mode, electrodes are energized for droplet actuation as the main processor sends droplet moving command to switch controller and assigns high voltage to electrode pads through photoMOS relays. During this mode, high voltage ground (HV GND) is connected to the system ground, as shown in FIG. 8. During the Forward Stream, neither charging block nor discharging block is engaged.

Figure 7:
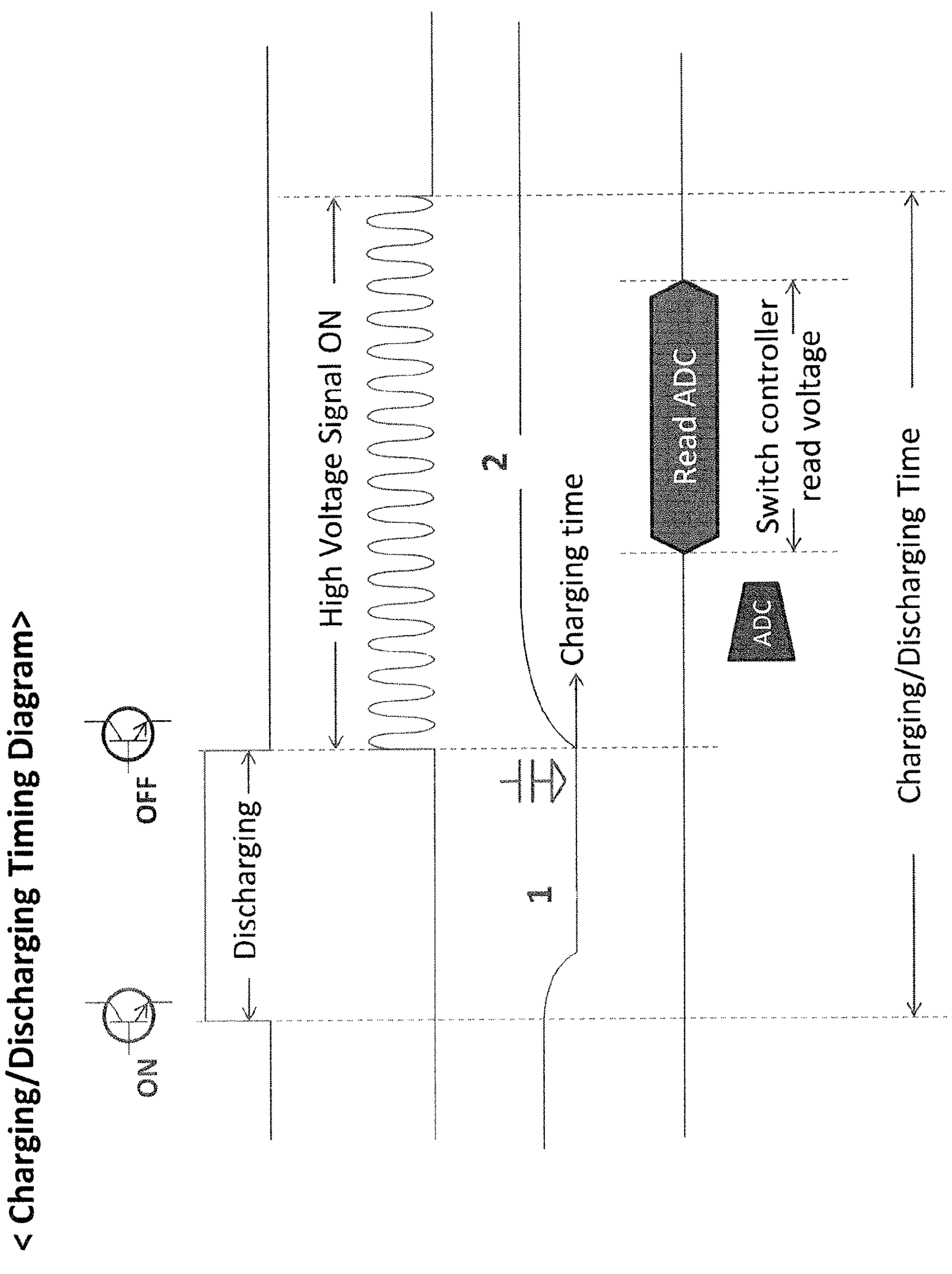
FIG. 7 illustrates charging and discharging timing diagrams based on an apparatus as described herein.

After the droplet actuation and the Forward Stream mode, switch controller disables all photoMOS relays and there is no high voltage signal between photoMOS relay and device. The transistor in the discharging block is turned ON to discharge the high voltage lines and the unwanted capacitance on the capacitor. This constitutes discharging time as shown in FIG. 7.

Figure 9:
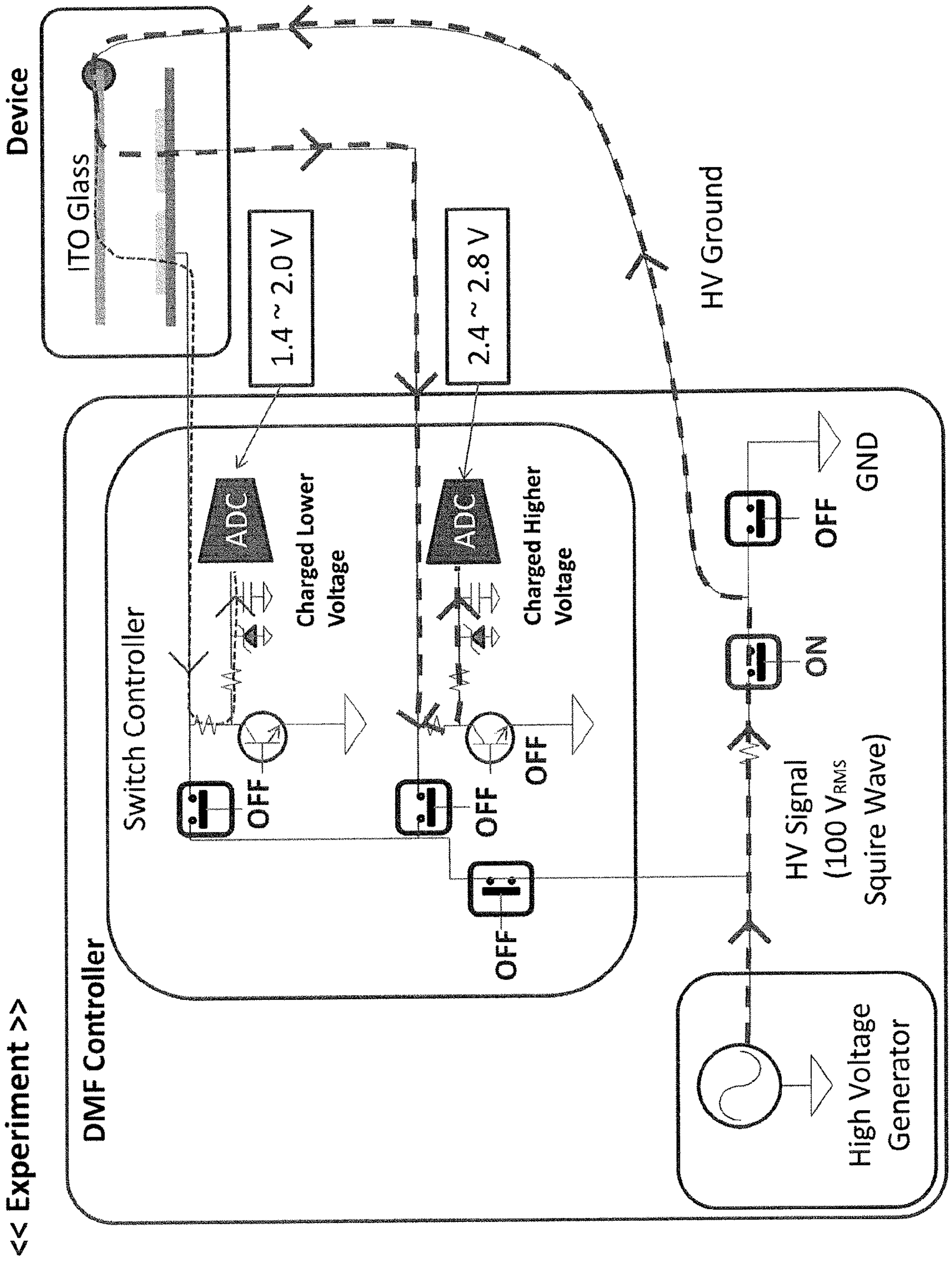
FIG. 9 is a schematic of one example of an electrical circuit for the 'Reverse Stream' mode for detecting the presence of a droplet on an electrode. Switch controller reads different ADC values for the two scenarios: 1) a droplet present on an electrode and 2) a droplet missing from an electrode.

The discharging time is followed by the Reverse Stream mode, when the main controller sends high voltage signal through the glass-ITO to the charging block. During this charging time, the photoMOS and the transistor are OFF so that the sent high voltage can charge the capacitor. If the droplet is present in the air gap the signal/voltage travels through the droplet, and the capacitor will be charged more than when the signal travels through air only in the absence of a droplet, resulting in the higher charged voltage. This is due to the droplet having higher conductivity than air. The switch controller detects the charged voltage through an analog to digital converter (ADC). For example, in the Reverse Stream mode in FIG. 9 two different charged voltage values are reported: a higher value of 2.4V-2.8V for a droplet present in the gap and a lower value of 1.4V-2.0V for an air gap only/absent electrode. After the Reverse Stream is completed, main processor enables high voltage switching and reconnects the high voltage ground (HV GND) and system ground (GND) bringing the system back into the Forward Stream mode for further droplet actuation.

Previously reported DMF feedback systems can only measure one charged voltage (or another electrical parameter) at a single time point. In these systems, there is one common measurement circuit and capacitor for all pads—the charging HV signal is sent through a pad (or multiple pads) to the top substrate and to the capacitor reporting only one feedback value. Even if multiple pads are engaged and measured there is only one voltage output. To obtain multiple pad reading the resulting charged voltage has to be measured for each pad sequentially making the DMF operations slow and inefficient. On contrary, Reverse Stream can read charged signals from different pads at a single time point and hence detect multiple droplets simultaneously as each pad is supplied with its own charging block, capacitor and the ADC. This makes Reverse Stream feedback system more advantageous over the prior art as digital microfluidic devices are typically used to miniaturize complex biochemistry protocols that require multiple, parallel droplet manipulations.

Applications of the 'Reverse Stream' Feedback System

The Reverse Stream feedback system reports a voltage value dependent on a droplet presence on an electrode pad. If a droplet occupies an electrode pad through which the measuring signal is sent through, the capacitor gets charged more and the reported voltage is significantly higher than in the case of an absent droplet when the measuring signal is sent though the air gap. This is due to the difference between the conductivities of the two media—air and water.

Figure 10:
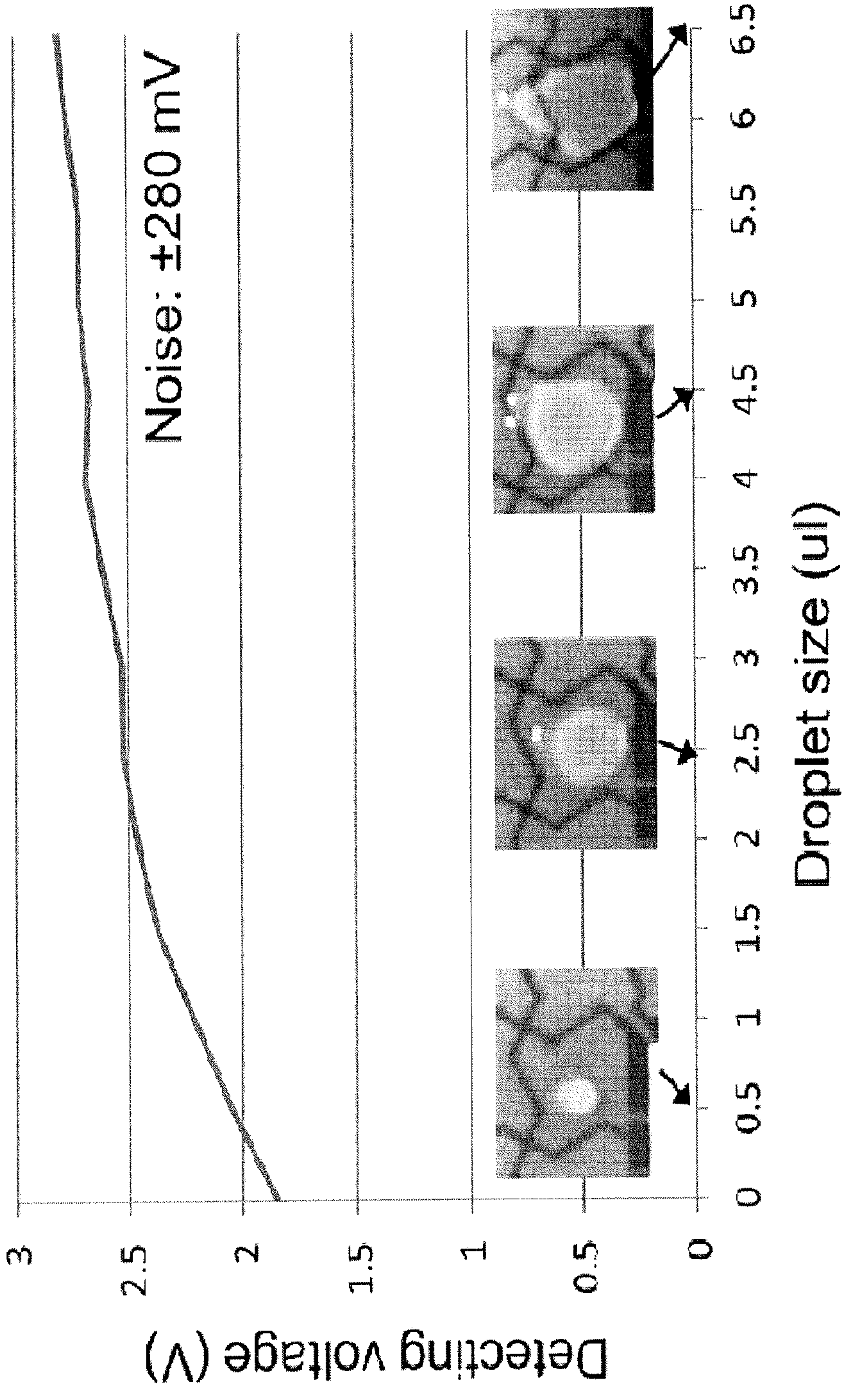
FIG. 10 illustrates one method of detecting voltage value depends on the size of the droplet occupying the electrode pad.

We have also observed that the reported voltage value varies with the droplet base area size covering the electrode pad—the more area has been covered by a droplet, the higher the voltage reading is (FIG. 10). The sensitivity of our feedback system allows not only simple Yes/No answer to the question of a droplet presence on an electrode pad but can also help determine how much of an area is occupied by a droplet.

The main use of the feedback system is to correct droplet motion. If the detected voltage indicates is below the threshold value, indicating not fully covered electrode, the high voltage signal can be reapplied until the threshold voltage has been reached. The threshold voltage indicates full coverage of the electrode and successful droplet actuation.

Additionally, the information about the area covered by a droplet can be used to determine evaporation rate of a stationary droplet. With evaporation, the base area of the droplet reduces and hence the detected voltage. The measured evaporation rate can be used to trigger evaporation management methods like droplet replenishment. For example, if the feedback voltage readout indicates that 70% of the electrode area is covered by a droplet, i.e. 30% of the droplet has evaporated, a supplementing droplet may be actuated to merge with the evaporating droplet to correct for the volume loss.

In another embodiment, Reverse Stream system can be used to determine the composition of a droplet. The conductivity of a droplet depends on its constituents and can affect the charged voltage. With enough sensitivity, the system could potentially differentiate solutions of different conductivities and compositions.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A digital microfluidic (DMF) apparatus with parallel droplet detection, the apparatus comprising:

- a first plate having a plurality of actuation electrodes;
- a second plate having one or more ground electrodes, wherein the second plate is spaced opposite from the first plate by a gap;
- a voltage source;
- a plurality of sensing circuits, wherein a sensing circuit from the plurality of sensing circuits is electrically connected to each actuation electrode, wherein each sensing circuit is configured to detect a charge voltage of a capacitor in a charging circuit of the sensing circuit, further wherein each sensing circuit of the plurality of sensing circuits comprises the charging circuit, a discharging circuit, and an analog-to-digital converter; and
- a controller configured to alternate between applying voltage from the voltage source to the first plate and the second plate, wherein applying voltage to the first plate comprises applying voltage to one or more actuation electrodes from the plurality of actuation electrodes to move one or more droplets within the gap, and wherein applying voltage to the second plate comprises applying voltage to the one or more ground electrodes, further wherein the controller is configured to sense, in parallel, the location of one or more droplets relative to the plurality of actuation electrodes based on input from each of the sensing circuits when applying voltage to the second plate.

2. The apparatus of claim 1, wherein the discharging circuit comprises a transistor and a ground.

3. The apparatus of claim 1, wherein the charging circuit comprises a capacitor and a diode.

4. The apparatus of claim 1, wherein the ADC is configured to detect the charged voltage of the charging circuit.

5. The apparatus of claim 1, wherein the controller is configured to sequentially activate the discharge circuit, then the charging circuit, and to receive the charged voltage of the charging circuit from the ADC in parallel for all of the sensing circuits of the plurality of sensing circuits.

6. The apparatus of claim 1, further comprising a forward/reverse switch connected between the voltage source, the one or more ground electrodes, and the plurality of actuation electrodes, wherein the controller is configured to operate the forward/reverse switch to switch between applying voltage to the first plate and the second plate.

7. The apparatus of claim 1, further comprising a plurality of electrode switches, wherein each electrode switch from the plurality of electrode switches is connected to an actuation electrode of the plurality of actuation electrodes and is controlled by the controller through a switch controller to apply voltage from the voltage source to the actuation electrode.

8. The apparatus of claim 1, wherein the voltage supply comprises a high-voltage supply.

9. The apparatus of claim 1, wherein the controller is configured to compare a voltage sensed by each of the plurality of sensing circuits to a threshold voltage value to determine the location of one or more droplets relative to the plurality of actuation electrodes.

10. The apparatus of claim 1, wherein the controller is configured to compare a voltage sensed by each of the plurality of sensing circuits to a predetermined voltage value or range of voltage values to determine the size of one or more droplets.

11. A method of simultaneously determining the locations of multiple drops in a digital microfluidics (DMF) apparatus, the method comprising:

- applying voltage to a plurality of actuation electrodes in a first plate to move one or more droplets within a gap between the first plate and a second plate;
- applying voltage to one or more ground electrodes in the second plate;
- concurrently sensing, in a plurality of sensing circuits, wherein each actuation electrode is associated with a separate sensing circuit from the plurality of sensing circuits, a charging voltage while applying voltage to the one or more ground electrodes; and
- determining a location of the one or more droplets relative to the plurality of actuation electrodes based on the sensed charging voltages by comparing the sensed charging voltages to a predetermined value or range of values to determine if a droplet is on or adjacent to an actuation electrode.

12. The method of claim 11, wherein applying voltage to the plurality of actuation electrodes and applying voltage to the one or more ground electrodes comprises applying voltage from the same high voltage source.

13. The method of claim 11, wherein applying voltage to the plurality of actuation electrodes comprises sequentially applying voltage to adjacent actuation electrodes.

14. The method of claim 11 further comprising re-applying voltage to one or more of the plurality of actuation electrodes based on the determined location of the one or more droplets.

15. The method of claim 11, wherein applying voltage to one or more ground electrodes in the second plate comprises applying voltage to the one or more ground electrodes without applying voltage to the actuation electrodes in the first plate.

16. The method of claim 11, further comprising discharging voltage in each of the sensing circuits in the first plate prior to applying voltage to the one or more ground electrodes.

17. The method of claim 11, further comprising charging a capacitor in each of the sensing circuits of a plurality of sensing circuits in the first plate when applying voltage to the one or more ground electrodes.

18. The method of claim 11, further comprising discharging voltage in each of the sensing circuits prior to applying voltage to the one or more ground electrodes and then charging a capacitor in each of the sensing circuits in the plurality of sensing circuits when applying voltage to the one or more ground electrodes.

19. The method of claim 11, further comprising determining the size of the one or more droplets based on the sensed charging voltages.

20. The method of claim 11, further comprising correcting droplet motion based on the determined location of the one or more droplets.

21. The method of claim 11, further comprising determining an evaporation rate based on the sensed charging voltages.

22. A method of simultaneously determining size or the locations of multiple drops in a digital microfluidics (DMF) apparatus, the method comprising:

applying voltage to a plurality of actuation electrodes in a first plate to move one or more droplets within a gap between the first plate and a second plate;

discharging voltage in each sensing circuit of a plurality of sensing circuits when not applying voltage to the plurality of actuation electrodes in the first plate, wherein each actuation electrode is associated with a separate sensing circuit from the plurality of sensing circuits;

applying voltage to one or more ground electrodes in the second plate after discharging the voltage;

concurrently sensing, in each of the sensing circuits, a charging voltage while applying voltage to the one or more ground electrodes; and determining a size or location of the one or more droplets relative to the plurality of actuation electrodes based on the sensed charging voltages.

23. A method of simultaneously determining the locations of multiple drops in a digital microfluidics (DMF) apparatus, the method comprising:

applying voltage to a plurality of actuation electrodes in a first plate to move one or more droplets within a gap between the first plate and a second plate;

applying voltage to one or more ground electrodes in the second plate;

concurrently sensing, in a plurality of sensing circuits, wherein each actuation electrode is associated with a separate sensing circuit from the plurality of sensing circuits, a charging voltage while applying voltage to the one or more ground electrodes;

determining a location of the one or more droplets relative to the plurality of actuation electrodes based on the sensed charging voltages; and determining the size of the one or more droplets based on the sensed charging voltages.

24. A method of simultaneously determining the locations of multiple drops in a digital microfluidics (DMF) apparatus, the method comprising:

applying voltage to a plurality of actuation electrodes in a first plate to move one or more droplets within a gap between the first plate and a second plate;

applying voltage to one or more ground electrodes in the second plate;

concurrently sensing, in a plurality of sensing circuits, wherein each actuation electrode is associated with a separate sensing circuit from the plurality of sensing circuits, a charging voltage while applying voltage to the one or more ground electrodes;

determining a location of the one or more droplets relative to the plurality of actuation electrodes based on the sensed charging voltages; and determining an evaporation rate based on the sensed charging voltages.

* * * * *